April 21, 1970     B. R. NELSON     3,507,336
TRAVELING IRRIGATION SPRINKLER
Filed Dec. 20, 1965     13 Sheets-Sheet 1

INVENTOR
BARTON R. NELSON

BY Cushman, Darby, Cushman
ATTORNEYS

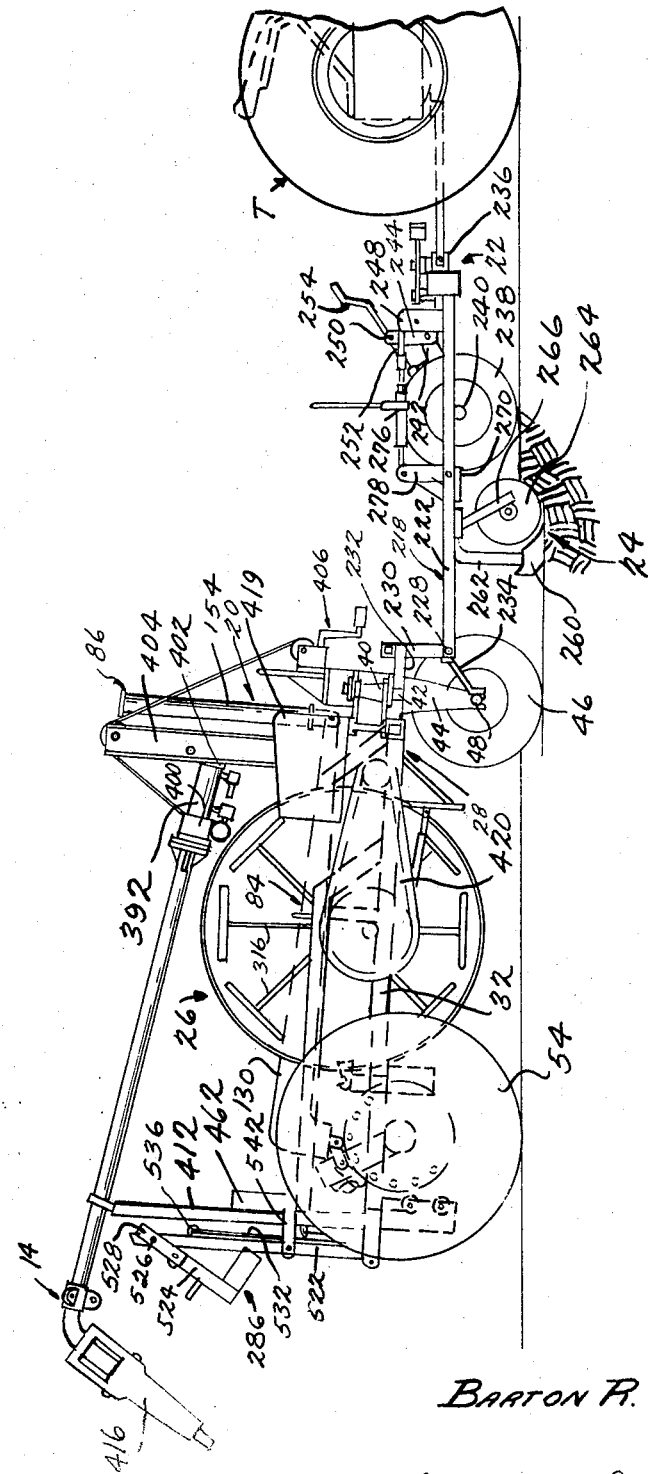

April 21, 1970   B. R. NELSON   3,507,336
TRAVELING IRRIGATION SPRINKLER
Filed Dec. 20, 1965   13 Sheets-Sheet 3

INVENTOR
BARTON R. NELSON
BY Cushman, Darby & Cushman
ATTORNEYS

April 21, 1970

B. R. NELSON 3,507,336

TRAVELING IRRIGATION SPRINKLER

Filed Dec. 20, 1965

INVENTOR
BARTON R. NELSON

BY
Cushman, Darby & Cushman
ATTORNEYS

April 21, 1970
B. R. NELSON
3,507,336
TRAVELING IRRIGATION SPRINKLER
Filed Dec. 20, 1965
13 Sheets-Sheet 5
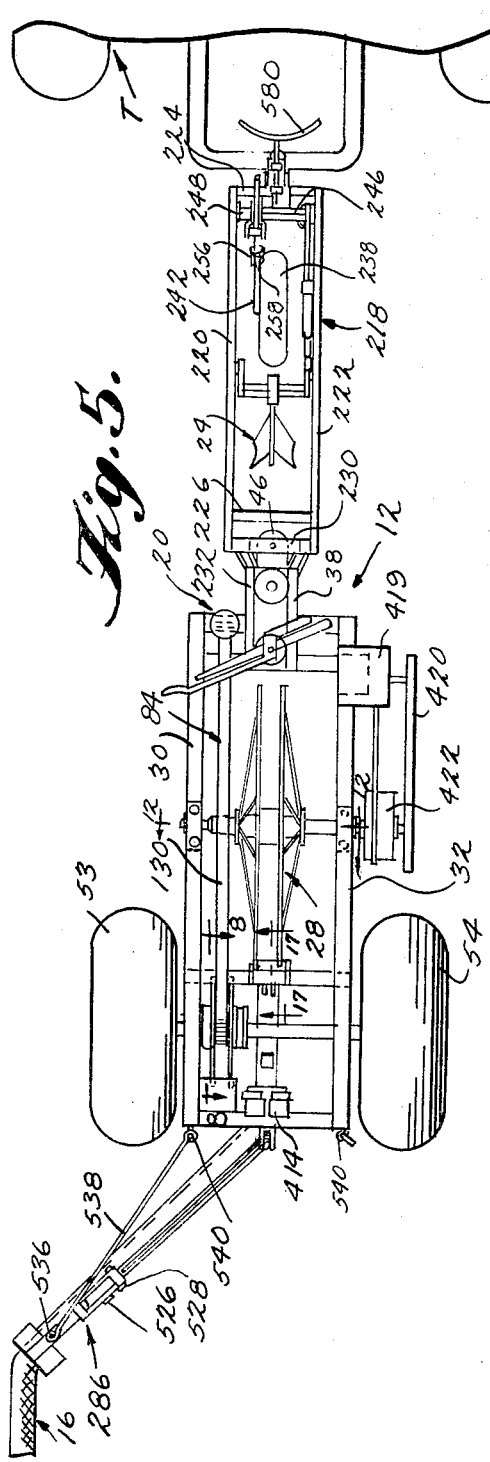
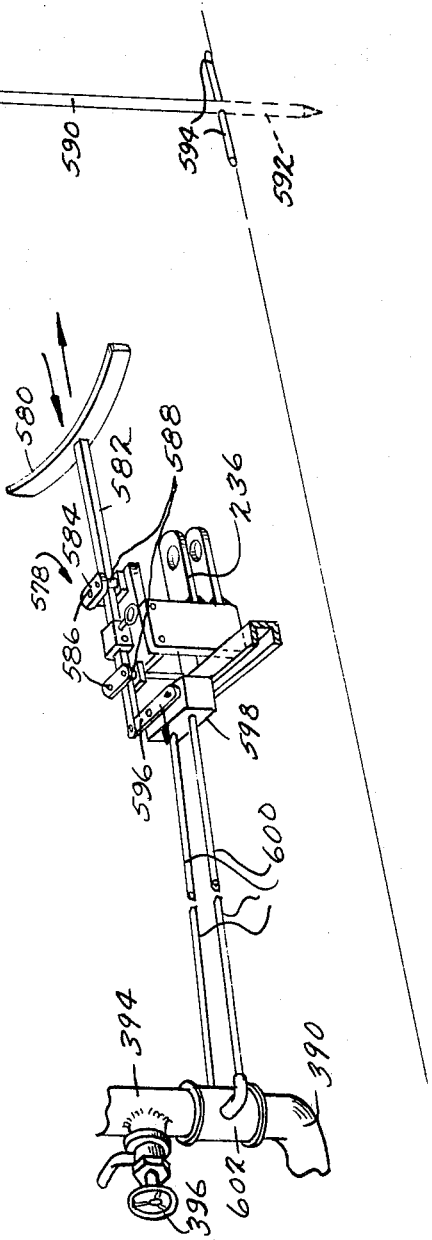
INVENTOR
*BARTON R. NELSON*
BY *Cushman, Darby & Cushman*
ATTORNEYS

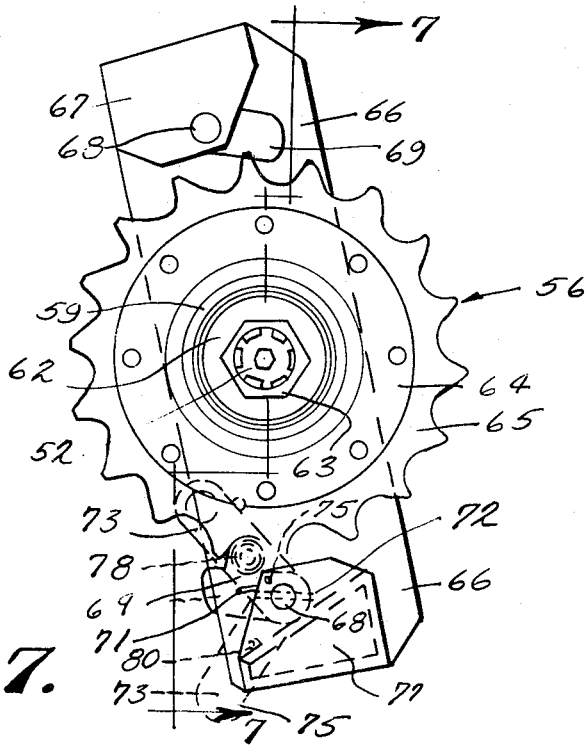
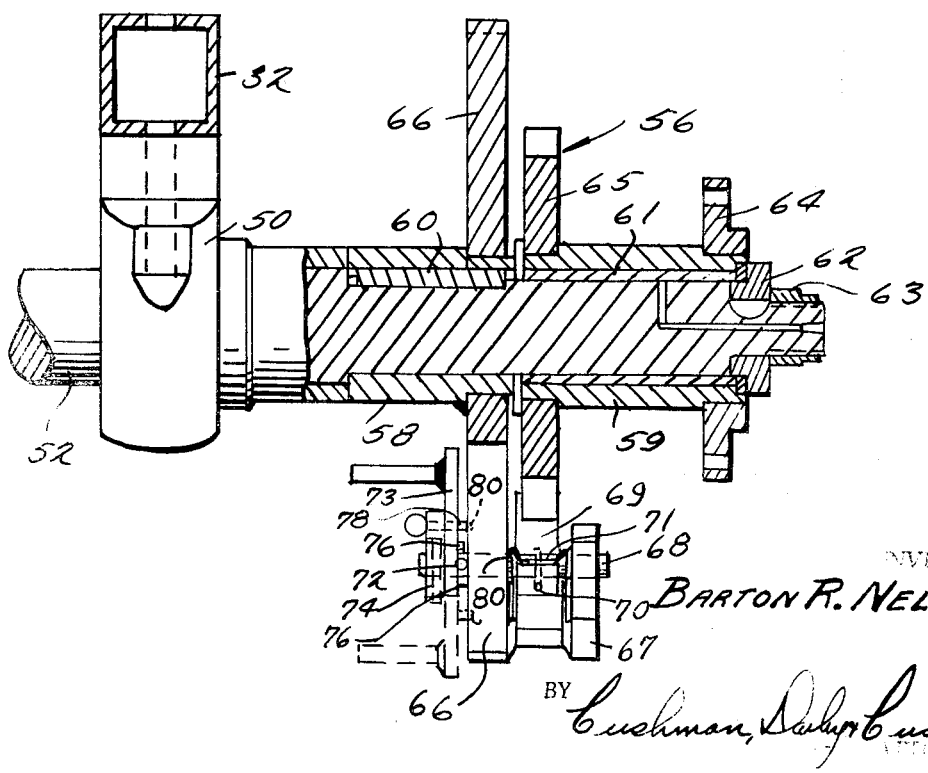

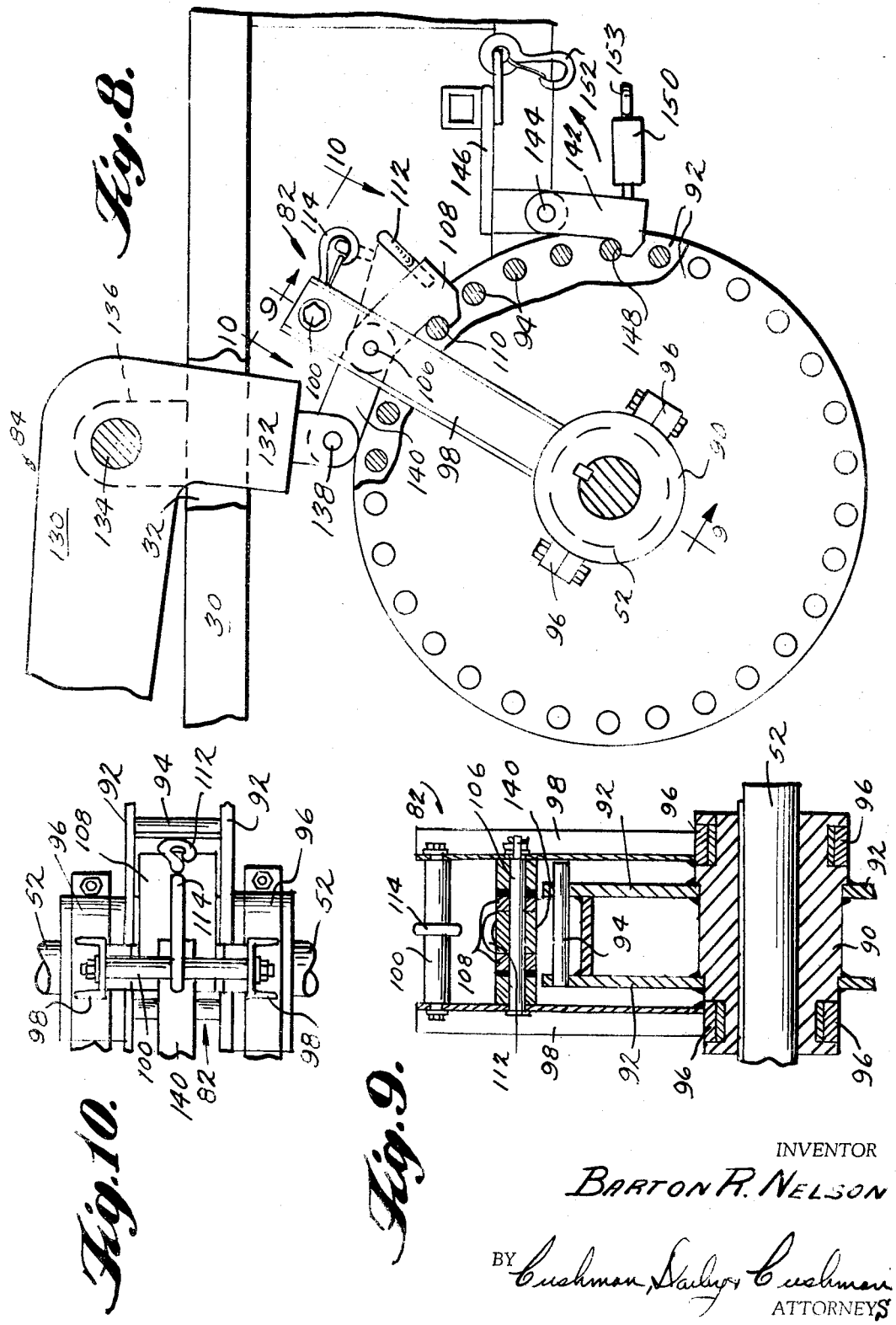

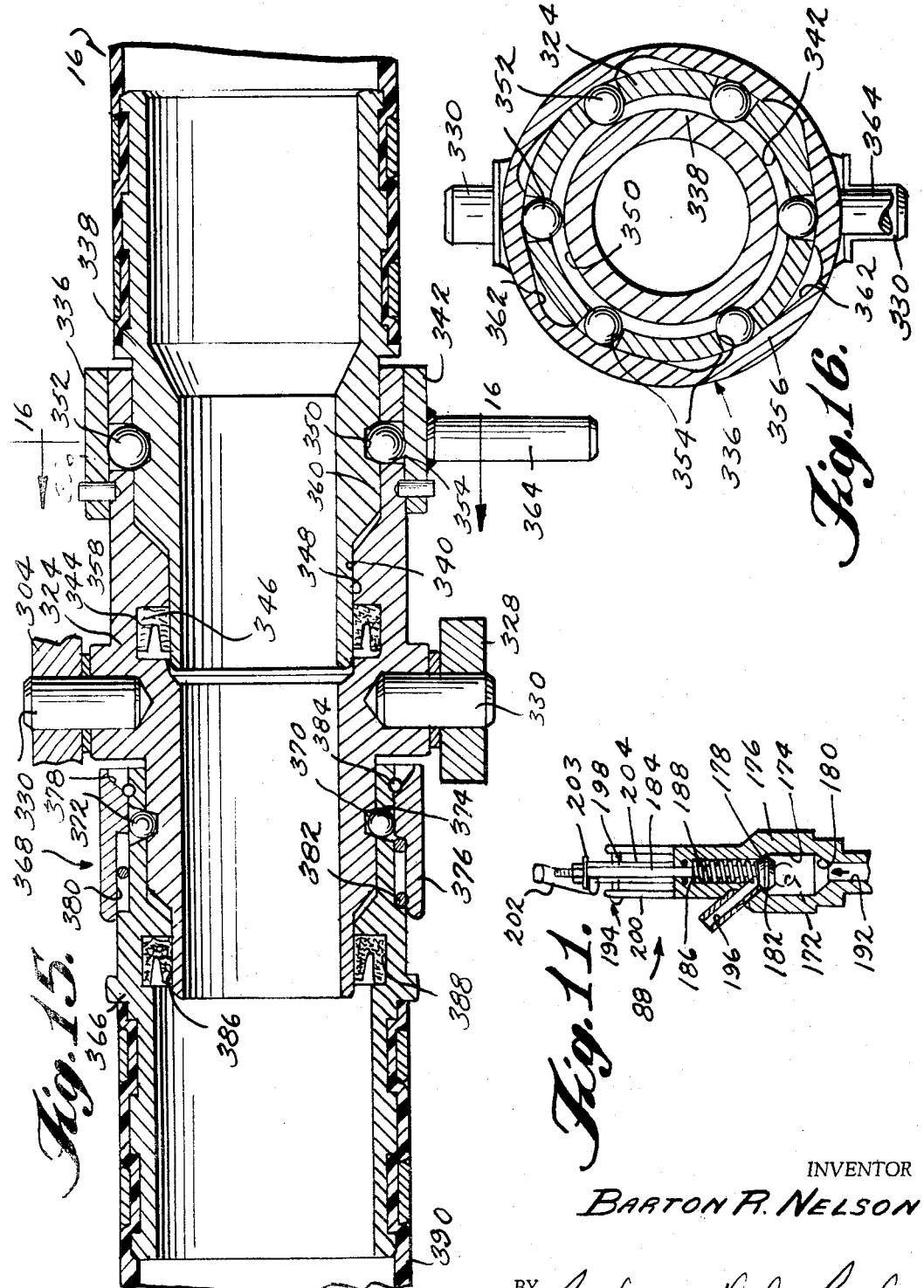

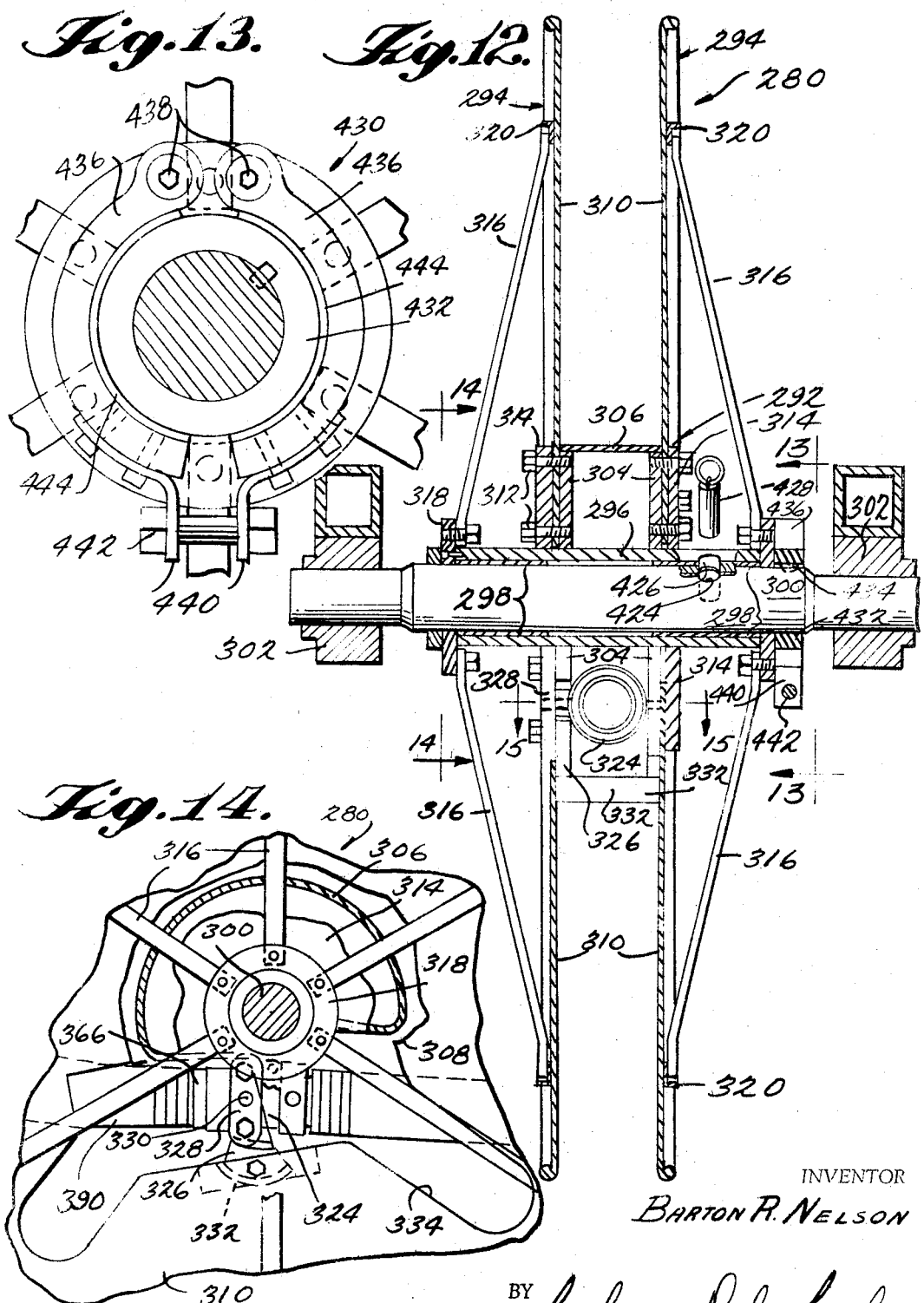

April 21, 1970     B. R. NELSON     3,507,336
TRAVELING IRRIGATION SPRINKLER
Filed Dec. 20, 1965     13 Sheets-Sheet 10
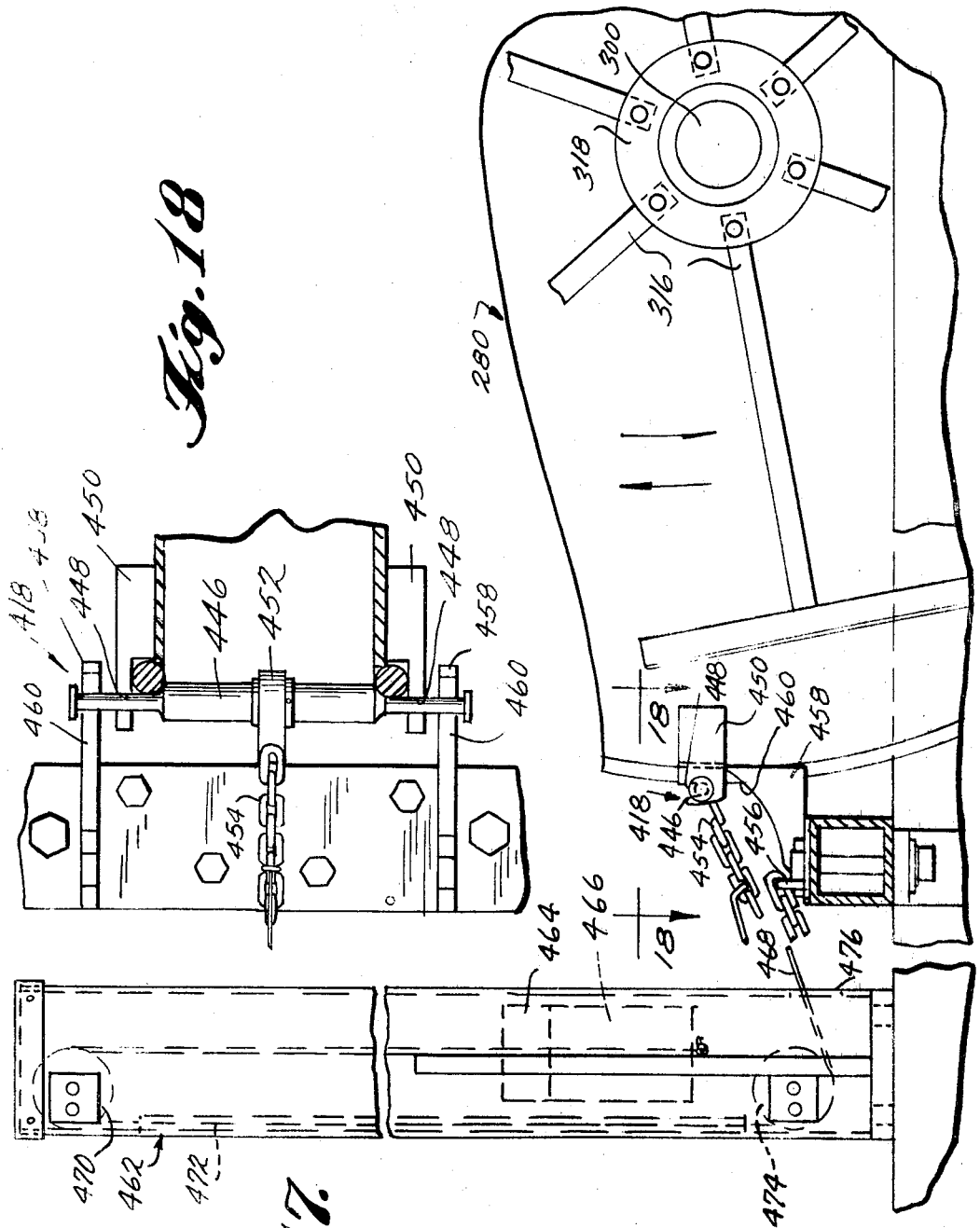
INVENTOR
*BARTON R. NELSON*
BY *Cushman, Darby & Cushman*
ATTORNEYS

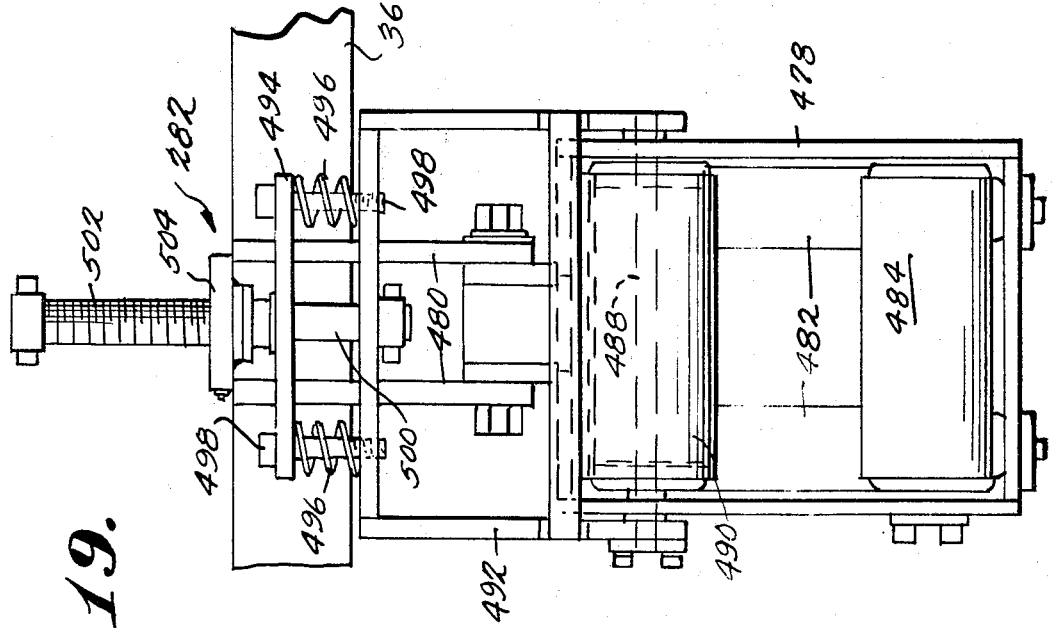
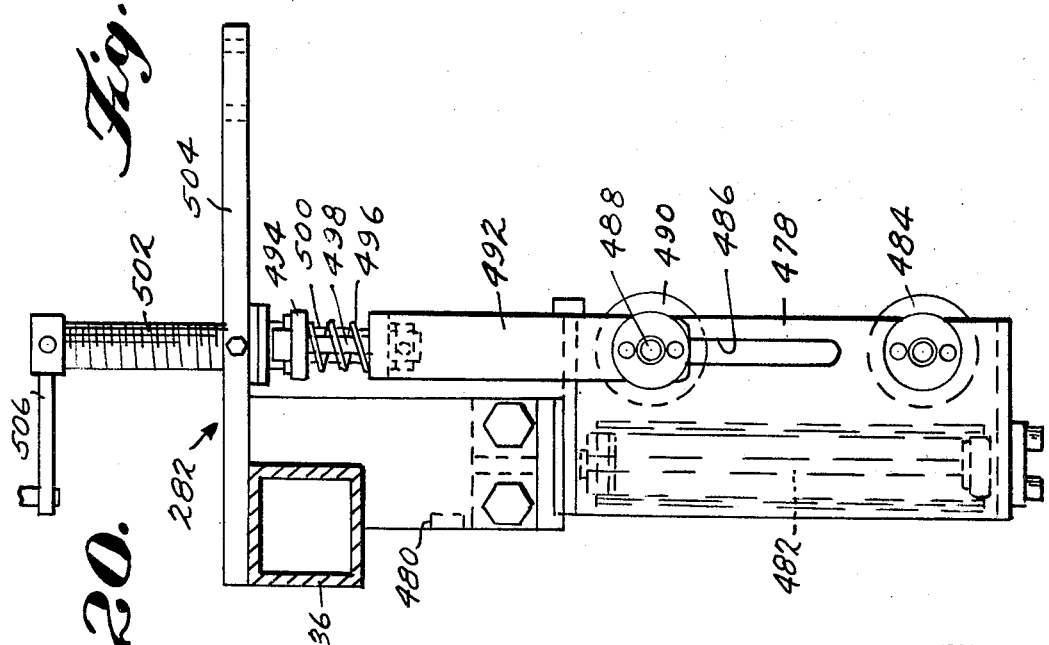

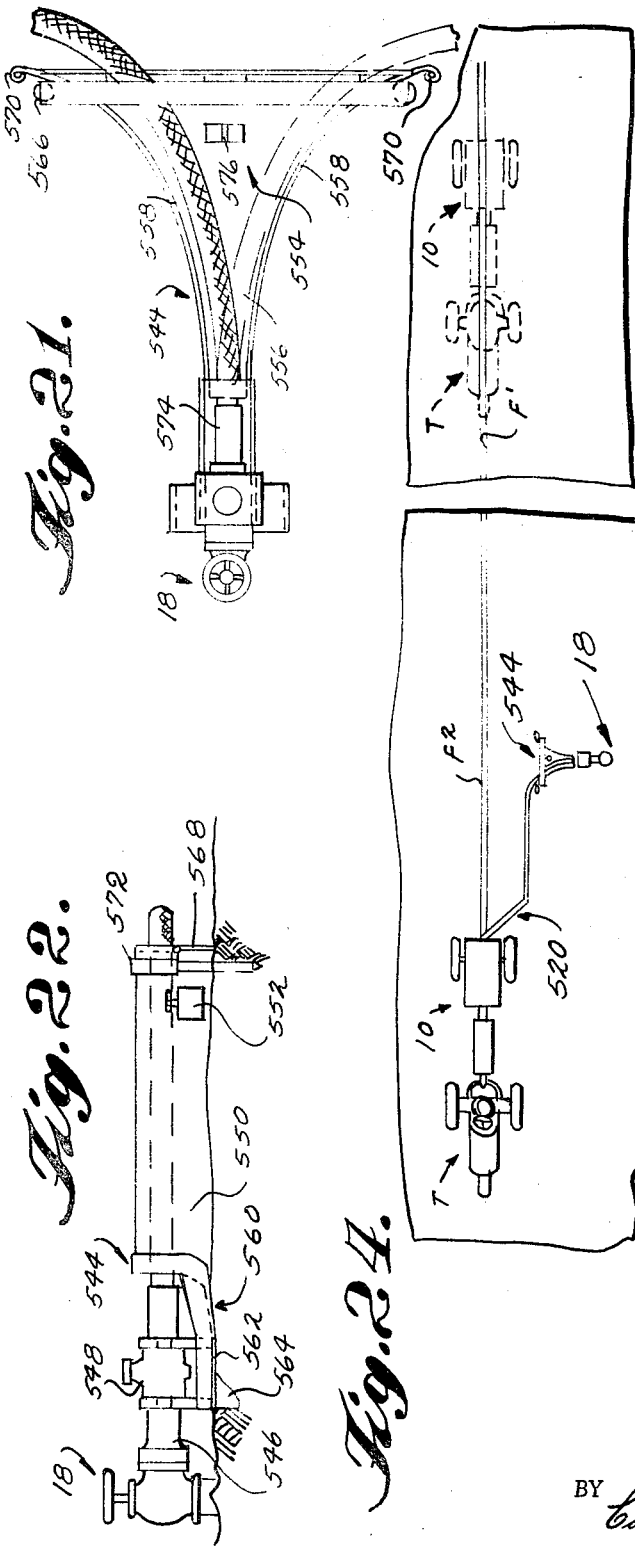

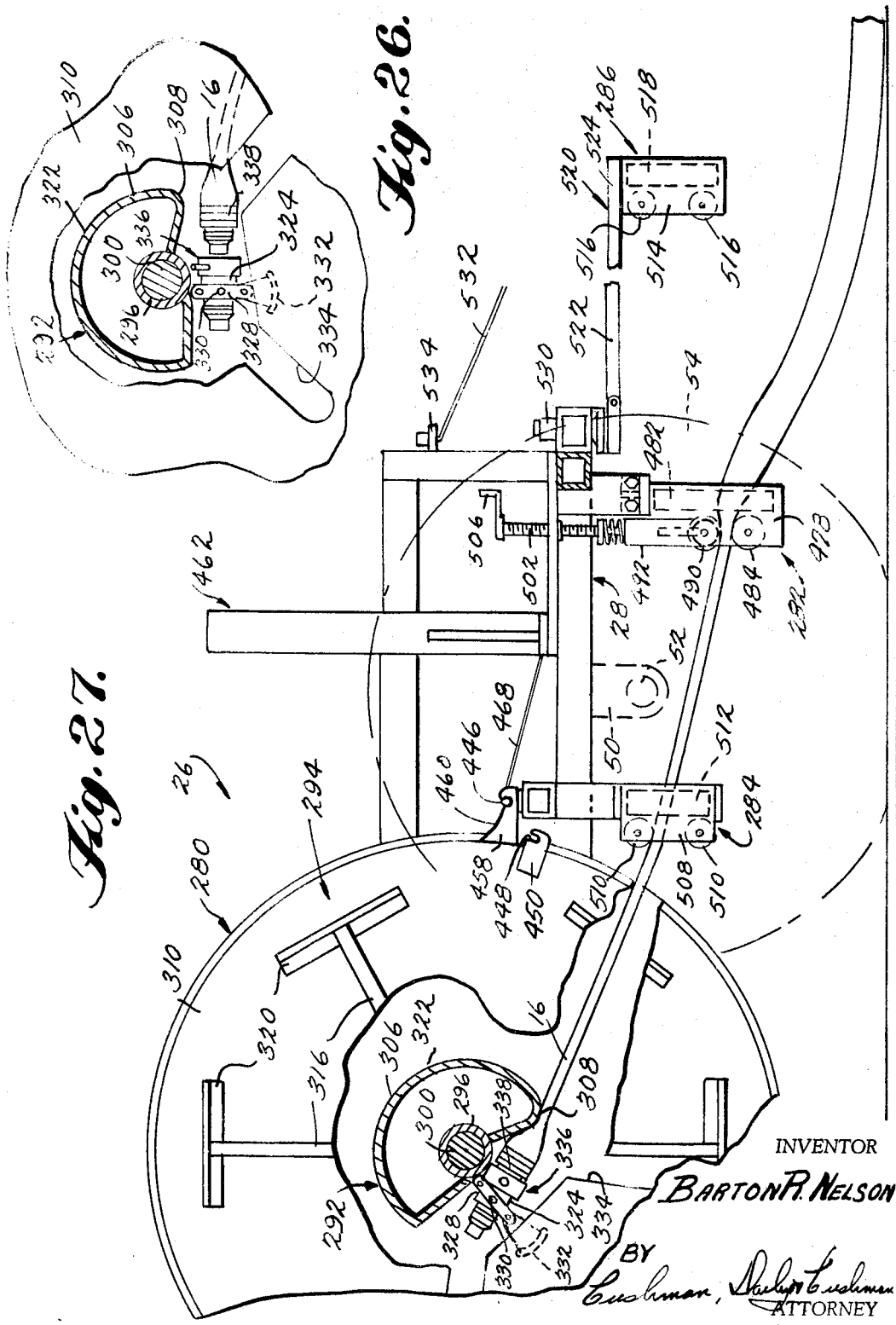

United States Patent Office 3,507,336
Patented Apr. 21, 1970

3,507,336
TRAVELING IRRIGATION SPRINKLER
Barton R. Nelson, Peoria, Ill., assignor to L. R. Nelson Mfg. Co., Inc., Peoria, Ill., a corporation of Illinois
Continuation-in-part of applications Ser. No. 327,768, Dec. 3, 1963, and Ser. No. 478,594, Aug. 10, 1965. This application Dec. 20, 1965, Ser. No. 514,786
Int. Cl. A01g 25/00
U.S. Cl. 172—438
26 Claims

ABSTRACT OF THE DISCLOSURE

A traveling irrigation sprinkler including a vehicle frame supported for movement along a field or the like to be sprinkler irrigated by wheels including steerable wheels, the vehicle frame carrying an irrigation sprinkler head adapted to be connected to a grounded source of water under pressure by an extended length of flexible, collapsible hose. The sprinkler head is connected in parallel with a water motor which provides a source of motive power to the vehicle. The vehicle is provided with a furrow engaging member which is adapted to ride within a preformed furrow in the ground which is to be irrigated, the furrow determining the path of movement of the vehicle within the field. The furrow engaging member is connected to the steerable wheels of the vehicle through a motion transmitting mechanism to ensure that the vehicle will be guided along a path commensurate with the preformed furrow.

A power operated reel is mounted on the vehicle frame and is provided with a pivoted coupling at its hub which is adapted to connect with one end of the flexible collapsible hose so that the hose can be wound up upon the reel in a collapsed condition substantially free of contained water, and be carried thereby on the vehicle frame in a compact bundle.

---

This application constitutes a continuation-in-part of my co-pending application Ser. No. 327,768, filed Dec. 3, 1963, now Patent No. 3,235,009 and a continuation-in-part of my copending application Ser. No. 478,594, now abandoned, filed Aug. 10, 1965.

This invention relates to sprinkling, and more particularly to an improved apparatus especially useful in agricultural irrigation of fields and the like.

The problems presented in sprinkler irrigating agricultural fields are considerably more imposing than those presented in sprinkling lawns and other grassy areas such as football fields, golf courses and the like. While traveling sprinklers have been successfully employed for lawn sprinkling and athletic field sprinkling, heretofore sprinkler irrigation of agricultural fields by traveling sprinklers has not received any widespread acceptance. The sprinkler irrigation systems most usually employed are fixed during watering and usually embody the use of fixedly connected aluminum pipe sections which are usually 30′ in length but may be as long as 40′. The diameter of the pipe section varies as desired from approximately 4″ to as high as 8″. In a typical installation, a series of pipe sections are coupled together to a total length of approximately a quarter mile or more. Riser pipes are secured to the coupling means at intervals of approximately 60′, each riser having a separate nozzle on its upper end. Water is pumped to the spray nozzles and the spray from each nozzle extends in a radius of approximately 40′. In a normal operation, spraying will be continued for a period of approximately 8–10 hours and then the pipe sections must be moved over a distance of approximately 60′ to irrigate the next area of the field.

This system has achieved a measure of acceptance, particularly in those areas where manual labor can be obtained inexpensively. When it is considered that a pipe section with a riser attached can weigh anywhere from 35 to 50 pounds and that the ground from which the pipe sections must be moved has been soaked with water for an 8–10 hour period, it can be seen that the manual labor required to effect movement of the pipes is difficult and extremely unpleasant. The labor problem is complicated and made more difficult where the system is utilized in a corn field or the like, where the pipe sections must be carried over the tops of the corn stalks in order to prevent damage.

There have been many proposals made to alleviate the labor problem presented in sprinkler irrigating with an aluminum pipe section system mentioned above. In general, these proposals have not proven entirely satisfactory. Thus, while the benefits of sprinkler irrigation are well recognized, the adoption of this type of irrigation has not become as widespread as is indicated by the benefits to be derived, primarily because of the labor problem presented in setting up or moving the system from one location in the field to the next.

For example, there have been machines developed which are adapted to follow an irrigation ditch provided in the field, the machine being adapted to draw water from the irrigation ditch during its movement therealong and spray the same over the field with conventional sprinkler heads. A machine of this type, of course, eliminates the necessity of providing an elongated pipe section system. However, because the source of water to the machine is not under pressure, such machines are limited to those areas where flow of water through the irrigation ditches can be accomplished by gravity. Consequently, such machines are not suitable to hilly conditions. Moreover, where permanent irrigation ditches are provided in the field, crops can not be grown in the same area.

Still another machine which has received some acceptance embodies in essence an elongated sprinkler pipe section system which is articulated between sections and mounted on wheels for movement in a circular path in a field. The machine is guided in its path of movement about a fixed source of water in the field which is swivelly connected to one end of the pipe system, the latter moving about the source as a center. The circular path of movement of the machine limits the spray pattern to a circular one so that in conventional rectangular fields the corner portions of the field are not adequately irrigated, if at all.

An object of the present invention is the provision of a machine which achieves many of the advantages of the known machines, while eliminating the disadvantages thereof.

A further object of the present invention is the provision of an irrigation sprinkler which is self-movable in a field so as to eliminate the requirement for an attendant during its operation, which utilizes a flexible conduit to convey a source of water under pressure from a fixed position to the movable spraying heads during operation, so as to eliminate the necessity of handling elongated rigid pipe sections and which is capable of a self-propelled movement in a field through a variable path so as to provide a spray pattern which can accommodate various conditions encountered both as to the shape of the field in plan, as well as the shape of the field vertically, that is, whether it is flat or hilly.

The problem presented is essentially one of handling the extensive lengths of conduit which are necessary in dealing with the capacity of water involved in sprinkler irrigation. In accordance with the present invention, the sprinkling means of the system is self-propelled during the sprinkling operation, enabling the sprinkling means to cover a maximum area during operation with a minimum amount of conduit. The conduit provided is in the form of a flexible collapsible hose which is capable of being dragged along the field by the traveling sprinkler during operation and which is also capable of being reeled up into a compact bundle or single roll for simple transportation to the next location of operation in the field in a condition free of any contained water.

The present invention achieves extensive water area coverage with the base length employed, by connecting one end of the hose, for example 600' in length, to a source of water under pressure in the field and beginning the sprinkling operation with the hose completely extended. In this way, the sprinkler can then travel in a direction toward the source for 600' and in a direction away from the source for an additional 600', thus making it possible to irrigate an area of the field having a length substantially double that of the length of hose.

The present system preferably embodies a novel system of guiding or steering the sprinkler during its travel which enables this result to be effectively obtained. Several methods of guiding or steering traveling lawn sprinklers or traveling athletic field sprinklers have been proposed and employed. The usual system is to utilize the hose itself as the guiding medium. However, this system clearly limits the guided path of movement to the length of the hose. Another system proposed is the utilization of a guide cable which, while not limiting the travel to the length of the hose, generally limits the movement of the sprinkler to a straight path unless an elaborate system for changing the direction is employed. Moreover, the cable system adds weight and cost to the apparatus and presents difficulties in the setting up operation. In addition to the above, machines of the type which are moved along an irrigation ditch have already been mentioned. Such machines are guided in their path of movement by engagement with such irrigation ditches, however, a permanent relatively deep irrigation ditch is essentially different from a relatively shallow guide furrow such as contemplated by the present invention.

In accordance with the preferred embodiment of the present invention the sprinkler is guided on its movement through the field by sensing the elongated contour of a furrow formed in the field. In this way the present system is readily applicable to existing conditions and particularly to those fields where rows of crops are planted. The furrow may either be formed by the use of the apparatus itself or with conventional furrow-forming equipment separate from the present apparatus.

Accordingly, it is a further object of the present invention to provide a steerable traveling sprinkler having an improved furrow follower means capable of sensing the elongated contour of a preformed furrow and guiding or steering the traveling sprinkler along a path conforming with the elongated contour of the furrow.

An important feature of the present invention is the utilization of a continuous length of flexible and collapsible hose which is not only easily handled during the sprinkling operation but is particularly suited to simple and convenient handling during the movement of the sprinkling apparatus from one position of operation in the field to the next. Utilizing the example previously mentioned of a 600' length of hose having, for example, a 4" diameter, it can be appreciated that to handle such a length of hose with water contained therein would be a highly impractical situation (e.g., a total weight of as much as two tons may be involved). With the present system the hose is collapsed as it is wound up into a transportable bundle, thus eliminating the need for making and breaking connections in the conduit and providing a system where the entire conduit in the form of a hose can be handled in a relatively simple fashion.

Still another object of the present invention is the provision of a traveling sprinkler of the type described having a power driven reel mechanism thereon capable of progressively collapsing and winding up an extensive length of flexible collapsible hose into a compact bundle or single roll free of contained water for convenient transportation from one area in the field to be sprinkled to another.

Still another object of the present invention is the provision of a traveling sprinkler of the type described having improved means for initially unwinding and depositing an extensive length of hose in the field prior to the actual sprinkling operation.

Still another object of the present invention is the provision of a traveling sprinkler of the type described having improved means for shutting off the source of water under pressure when the sprinkler has reached the end of its predetermined path of travel.

These and other objects of the present invention will become more apparent during the course of the following detailed description and appended claims.

The invention will best be understood with reference to the accompanying drawings wherein an illustrative embodiment is shown.

In the drawings:

FIGURE 2 is a view similar to FIGURE 1 showing the apparatus in its transport position being pulled by a tractor with the furrow former in operative position;

FIGURE 3 is a side elevational view of the main vehicle portion of the apparatus showing the water pressure actuated propelling mechanism in its lowermost position;

FIGURE 4 is a view similar to FIGURE 3 showing the water pressure actuated propelling mechanism in its uppermost position.

FIGURE 5 is a top plan view of the apparatus;

FIGURE 6 is an end view of a ratchet assembly through which a rear drive wheel of the vehicle is connected with the rear axle of the vehicle;

FIGURE 7 is a sectional view taken along the line 7—7 of FIGURE 6;

FIGURE 8 is an enlarged fragmentary cross-sectional view taken along the line 8—8 of FIGURE 5;

FIGURE 9 is a fragmentary sectional view taken along the line 9—9 of FIGURE 8;

FIGURE 10 is a fragmentary elevational view taken along the line 10—10 of FIGURE 8;

FIGURE 11 is an enlarged fragmentary cross-sectional view taken along the line 11—11 of FIGURE 3;

FIGURE 12 is an enlarged fragmentary sectional view taken along the line 12—12 of FIGURE 5;

FIGURE 13 is an enlarged fragmentary sectional view taken along the line 13—13 of FIGURE 12;

FIGURE 14 is a fragmentary sectional view taken along the line 14—14 of FIGURE 12;

FIGURE 15 is an enlarged fragmentary sectional view taken along the line 15—15 of FIGURE 12;

FIGURE 16 is a sectional view taken along the line 16—16 of FIGURE 15;

FIGURE 17 is an enlarged fragmentary sectional view taken along the line 17—17 of FIGURE 5;

FIGURE 18 is an enlarged fragmentary sectional view taken along the line 18—18 of FIGURE 17;

FIGURE 19 is an enlarged rear elevational view of the hose collapsing assembly;

FIGURE 20 is a side elevational view of the hose collapsing assembly;

FIGURE 21 is a top plan view of the water shutoff device;

FIGURE 22 is a side elevational view of the water shutoff device shown in FIGURE 21;

FIGURE 23 is a fragmentary perspective view showing a modified form of water shutoff device;

FIGURE 24 is a top plan view illustrating the initial steps in the preferred method of operating the apparatus of the present invention;

FIGURE 25 is a view similar to FIGURE 24 illustrating the final steps of the operation;

FIGURE 26 is a fragmentary side elevational view of the reel assembly, with parts broken, showing the release of the hose from the reel when pay out is completed; and FIGURE 27 is a fragmentary side elevational view of the hose handling means, with parts broken away, showing the position of the parts at the beginning of the winding up of the hose on the reel assembly.

Figure 1:
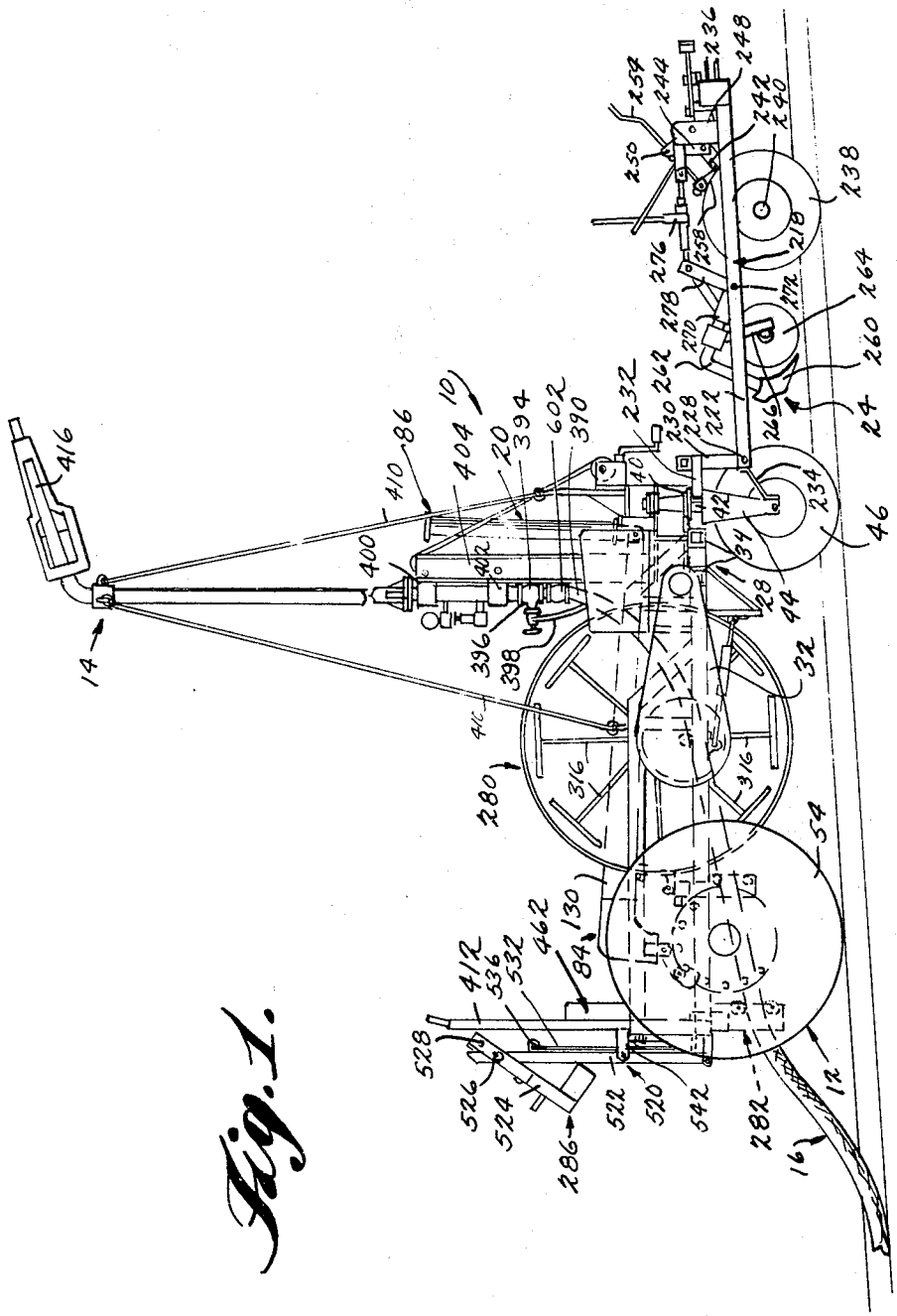
FIGURE 1 is a side elevational view of an apparatus embodying the principles of the present invention, showing the same in its operative sprinkling position.

Referring now more particularly to FIGURES 1 through 5, there is shown therein an apparatus, generally indicated at 10, embodying the principles of the present invention. The apparatus includes a vehicle assembly, generally indicated at 12, which supports a sprinkler assembly, generally indicated at 14, for movement along a predetermined path in a field to be sprinkled. Water under pressure is supplied to the sprinkler assembly 14 through a length of hose, generally indicated at 16, connectible with a source of water under pressure in the field, generally indicated at 18 (as shown in FIGURES 21, 22, 24 and 25). The vehicle assembly carrying the sprinkler assembly is propelled by a water pressure actuated propelling mechanism, generally indicated at 20 and shown more particularly in FIGURES 3 and 4.

The vehicle assembly 12 is guided during its propelled travel by means of a furrow follower steering assembly, generally indicated at 22. Preferably, the furrow follower steering assembly serves as a draft tongue by which the apparatus is connectible to a tractor T or the like (see FIGURES 2, 5 and 24) for movement from one position of use to another. In this regard, a furrow opener assembly 24 is mounted on the furrow follower steering assembly so that the present apparatus provides means for forming the furrow to be followed by the steering assembly when the apparatus is pulled by a tractor or the like. Finally, the apparatus includes hose handling means, generally indicated at 26, which functions to facilitate the use of the hose in the field and to facilitate storage of the hose in a compact bundle free of contained water for purposes of transportation.

VEHICLE ASSEMBLY

The vehicle assembly 12 comprises a main frame or body, generally indicated at 28, which may be of any suitable construction and, as shown, is of a generally box-like construction formed of rigidly interconnected tubular members. As shown, the frame includes a pair of horizontally spaced longitudinally extending truss members 30 and 32, the forward ends of the truss members being rigidly interconnected by a pair of horizontally spaced cross-members 34 and the rearward ends thereof being interconnected, as by a pair of vertically spaced cross-members 36. Fixedly secured to the central portion of the members 34 is a pair of parallel channel members 38 which project forwardly therefrom. A vertically extending bearing assembly, generally indicated at 40 is fixed between the forward ends of the channel members 38 within which the upper portion of a shaft 42 is journaled. The lower end of the shaft 42 is rigidly secured to the bight portion of an inverted U-shaped yoke 44. A front steerable wheel 46 is suitably mounted in the yoke, as by a shaft 48 journaled in the lower free ends of the yoke.

Fixedly secured to the truss members 30 and 32 in depending relation thereto at positions spaced forwardly of the rear cross-members 36 is a pair of bearing assemblies 50 within which is journaled a rear axle 52. Mounted on the ends of the rear axle 52 is a pair of rear drive wheels 53 and 54. The wheel 53 is fixed to the axle by any suitable means, such as a key or the like. The wheel 54 is mounted on the axle 52 selectively either for forward rotational movement in response to the forward rotational movement of the axle or for rearward rotational movement independent of the axle, as by a ratchet assembly, generally indicated at 56. As best shown in FIGURES 6 and 7, the ratchet assembly 56 includes an inner and outer sleeve 58 and 59, the inner sleeve 58 being fixed to the axle 52, by any suitable means, such as a key 60 or the like. The outer sleeve 59 is journaled on the axle, by any suitable means, such as a sleeve bearing 61 or the like. As shown, the outer sleeve is retained on the axle by a washer 62 fixed to an adjacent reduced outer end portion of the axle and a nut 63 threadedly engaged on the extremity of the reduced end portion.

Rigidly secured, as by welding or the like, to the periphery of the outer sleeve adjacent its outer end, is a disc member 64 to which the hub of the associated rear drive wheel 54 is fixedly secured in conventional fashion.

A ratchet wheel 65 of gear-like construction is fixedly secured to the outer periphery of the outer sleeve 59 adjacent its inner end. Extending radially outwardly from the inner sleeve 58 adjacent the wheel 65 is a pair of diametrically opposed arms 66 having generally L-shaped blocks 67 fixedly secured to their outer end portions. Pivotally mounted in the outer end of each arm 66 and a parallel of leg of the associated L-shaped block 67 is a shaft 68. An apertured pawl member 69 is engaged over each shaft 68 between the associated arm 66 and the parallel leg of the associated L-shaped block 67 in a position radially outwardly of the ratchet wheel 65. Each pawl member 69 is detachably fixed to the associated shaft 68 by any suitable means, such as a pin member 70 extending through the pawl member 69 and through the shaft 68. Each pawl member 69 includes a rounded free end portion adapted to engage between the teeth formed on the outer periphery of the ratchet wheel 65. Each pawl member is resiliently urged into engagement with the ratchet wheel by suitable spring means which, as shown, is in the form of U-shaped spring member 71 having its bight portion engaged with the pawl member and its legs coiled about the shaft with the free ends thereof bearing against the associated L-shaped block 67.

Each pawl member 69 is movable between an operative position, as shown in solid lines in FIGURES 6 and 7, wherein the outer end portion thereof engages the periphery of the ratchet wheel so as to prevent counter-clockwise movement thereof as shown in FIGURE 6 but to permit clockwise movement thereof and an inoperative position, as shown in phantom lines in FIGURES 6 and 7, wherein the pawl member is disposed out of engagement with the ratchet wheel so as to permit movement of the latter in either direction. To this end, each shaft 68 extends inwardly beyond the associated arm 66 and is provided with a pin 72 extending radially therethrough. Journaled on each shaft 68 at a position adjacent the associated pin 72 is an L-shaped actuating lever 73, the lever being rotatably retained on the extension of the associated shaft 68 by any suitable means, such as a collar assembly 74. Each actuating lever 73 is provided with a pair of pins 76 disposed in a position to engage the outwardly extending ends of the shaft pin 72. Each actuating lever 73 is moved between operative and inoperative positions corresponding to the operative and inoperative positions of the associated pawl member and is fixedly retained in such positions by a thumb screw 78 adapted to engage within one of a pair of recesses 80 formed in the adjacent surface of the associated arm 66.

It will be noted that when the actuating lever 73 is disposed in its operative position, the corresponding associated pawl member 69 will likewise be disposed in its operative position, the relative positions of the pins 72 and 76 being such as to permit the pawl member 69 to pivot into a position of full engagement between the teeth of the ratchet wheel and a position wherein the teeth ride over the pawl. When the actuating lever is moved into its inoperative position, the pins 76 will engage the ends of the associated pin 72 thus retaining the pawl member 69 in the phantom line position as shown in FIGURE 6 out of the path of the movement of the teeth of the ratchet wheel 65.

PROPELLING MECHANISM

As best shown in FIGURES 3 and 4, the propelling mechanism 20 includes a ratchet and pawl assembly, generally indicated at 82, mounted on the rear axle 52 between members 30 and 32 of the frame 12. The ratchet and pawl assembly 82 is actuated to turn the rear axle in response to the oscillatory movement of a lever assembly, generally indicated at 84, carried by the vehicle frame 12. The lever assembly is oscillated by a piston and cylinder assembly 86 pivotally mounted on the frame and actuated by a reversing valve assembly, generally indicated at 88.

As best shown in FIGURES 8–10, the ratchet and pawl assembly 82 includes a sleeve 90 fixed to the drive axle 52 by any suitable means, such as a key 89 or the like. Fixed to the outer periphery of the sleeve 90 between the ends thereof is a pair of discs 92 having a series of circumferentially spaced pins 94 extending between the outer peripheral portions thereof.

Journaled on the sleeve 90 on opposite sides of the disc 92, as by split bearings 96, is a pair of parallel arms 98 which extend radially outwardly of the axle 52 beyond the periphery of the disc 92 and have their free ends interconnected by a bolt 100.

Mounted between the arms 98 at a position spaced inwardly from the outer ends thereof and outwardly of the periphery of the discs is a pin 106 to which a bifurcated end of a pawl 108 is pivoted. The opposite end of the pawl is formed into a hook formation 110 adapted to engage the pins 94 between the discs 92. The pawl 108 is pivoted with a threaded opening opposite the hook 110 within which an eye bolt 112 is fixedly engaged. The eye bolt 112 cooperates with a spring latch member 114 carried by the shaft 100 for the purpose of retaining the pawl 108 in an inoperative position out of the path of movement of the pins 94 as shown in dotted lines in FIGURE 8.

The oscillating lever assembly 84 includes an elongated beam-like arm 130 extending generally parallel with the frame member 30 and an integral relatively short arm 132 extending downwardly from the rear end of the arm 130. The arms are apertured adjacent their intersection to receive a shaft 134 therethrough. The shaft is journaled on the rear end portion of the frame as by a pair of bearings 136 fixed to the upper surface of the frame members 30 and 32 respectively.

The lower end of the arm 132 is bifurcated and connected, as by a pivot pin 138, to one end of a link 140. The opposite end of the link 140 is pivotally connected with the pin 106 at a position between the bifurcated ends of the pawl member 108. It will be seen that if the lever assembly 84 is oscillated about the shaft 134, the arms 98 carrying the pawl member 108 will be oscillated about the axis of the axle 52 through the arm 132 and connecting link 140.

Preferably, an idler pawl 142 is pivotally mounted adjacent the rear of the discs 92, as by a pin 144 carried by a bracket 146 fixedly secured to the adjacent cross member 36. The idler pawl 142 includes a lower hook end portion 148 which is adapted to engage the pins 94. In the usual fashion, the pawl includes a lower cam surface which is engaged by the pins when the latter are moved in a counterclockwise direction, as viewed in FIGURE 8, so as to pivot the pawl in a counterclockwise direction as viewed in FIGURE 8 against the biasing action of a weight 150 fixedly carried by the pawl 142 opposite the hook 148. Again, a releasable latch member 152, similar to the latch 114, may be provided to selectively receive an eye bolt 153 fixed to the weight for retaining the idler pawl in an inoperable position out of engagement with the pins.

The piston and cylinder assembly 86 for effecting the oscillatory movement of the lever assembly 84 comprises a cylinder 154 of conventional construction having a sleeve 156 fixedly secured to the lower end thereof and extending downwardly therefrom. The sleeve is provided with a pair of diametrically opposed trunnion pins 158 which are pivotally engaged within a U-shaped connecting member 160 fixed to the forward end of the lever 130. Slidably mounted within the cylinder is a piston 162. The piston is provided with a central opening 164 extending from its upper surface to the lower surface thereof which communicates with the interior of a hollow piston rod 166. The upper end of the piston rod is secured to the piston and lower end thereof is fixed to a block 168 pivotally mounted on the forward portion of the vehicle frame, as indicated at 170. The block 168 is provided with a fluid passage 172 which communicates with the lower end of the hollow piston at one end and with a central chamber 174 formed in a valve housing 176 comprising a part of the reversing valve mechanism 88 (see FIGURE 11).

As best shown in FIGURE 11, the central chamber 174 of the valve housing 176 is formed with a pair of upper and lower valve seats 178 and 180 which are adapted to be engaged by corresponding upper and lower surfaces formed on a valve member 182. A valve stem 184 is slidably mounted within the valve housing and has its lower end fixedly secured to the valve member 182. The upper portion of the valve housing is formed with a bore 186 extending upwardly from the chamber 174 the upper end of which is engaged by the upper end of a coil spring 188 disposed in surrounding relation to the valve stem. The lower end of the spring 188 engages the valve member 182 so that the latter is biased by the spring into its lowermost position in engagement with the valve seat 180. In this position the valve member serves to prevent flow of water under pressure into the valve chamber 174 through an inlet passage 192 communicating with the valve seat 180. The valve member 182 is moved from its lowermost position in engagement with the lower seat 180 interrupting the communication between the inlet 192 and passage 172 by a bell crank lever, generally indicated at 194. It will also be noted that when the valve member is in its lowermost position, the passage 172 which communicates with the cylinder through the block 168 communicates with an outlet opening 196 in communication with the upper valve seat.

In order to effect this movement, the bell crank 194 is pivoted, as at 198, to a bracket 200 or the like fixed to the valve housing. Extending radially outwardly and rearwardly from the pivot 198 is a first bell crank arm 202, the outer end of which is bifurcated to engage selectively above the upper end of the valve stem 184 or below an enlarged washer 203 fixed to the valve stem at a position below the upper end thereof (FIGURE 11).

As best shown in FIGURES 3 and 4, the bell crank 194 includes a second arm 204 extending generally radially outwardly and from the pivot 198, the free end of which is connected to the upper end of a coil spring 206, the lower end of which is connected to the bracket 200. The bell crank arm 204 and the spring 206 constitute, in effect, an over-center type toggle linkage which serves to maintain the bell crank 194 in either one of two limiting positions as shown in FIGURES 3 and 4. One limiting position, as shown in FIGURES 3 and 11, corresponds with that in which the lower bifurcation of the arm 202 is in engagement below the washer 203 on the valve stem and the valve member 182 is in its uppermost position. In this regard, it will be noted that the strength of the spring 206 is greater than the strength of the spring 188 so that the valve member 182 will be maintained in its uppermost position by the spring 206 with the spring 188 compressed. As shown in FIGURE 4, the second limiting position corresponds to that wherein the upper bifurcation of the arm 202 is disposed above the upper end of the valve stem with the valve member 182 disposed in its lower position through the action of spring 188.

The bell crank 194 also includes a third arm 208, the outer end of which is pivotally connected to the lower end of a vertically extending actuating rod 210. Threadedly engaged on the actuating rod is a pair of upper and lower collars 212 and 214 which are adapted to be engaged by the outer end of a plate-like arm member 216 fixed to the lower end of the cylinder 154 at one end and having its other end apertured to receive the actuating rod between the collars 212 and 214.

OPERATION OF PROPELLING MECHANISM

Referring now more particularly to FIGURES 3, 4 and 8–11, the operation of the propelling mechanism 20 to move the vehicle assembly forwardly in operation will now be described. The cycle of operation is continuous and for sake of convenience in description the cycle will be described beginning with the introduction of water under pressure through the inlet 192, which is connected with the source of water under pressure 18 in a manner hereinafter more particularly described.

It will be noted at the beginning of the cycle the valve member 182 is disposed in its uppermost position, as shown in FIGURES 3 and 11, and that bell crank 194 is positioned with the lower bifurcation of the arm 202 in engagement below the washer 203 on the valve stem, the cylinder 154 is disposed in its lowermost position with respect to the piston 162 and hollow piston rod 166, the forward end of the lever 130 is disposed in its lowermost position, the driving pawl carrying arms 98 are disposed in their lowermost positions and the driving pawl 108 is disposed in engagement with a pin 94. With the parts in the positions set forth above and shown in FIGURE 3, water under pressure passes through the inlet opening 192, through the central chamber 174 of the valve mechanism 88 through passage 172 in the block 168, and into the upper end of the cylinder 154, through the hollow piston rod 166 and central opening 164 of the piston 162.

As the water under pressure enters the upper end of the cylinder, the cylinder is raised thereby moving the forward end of the lever 130 upwardly which, in turn, will effect a counterclockwise movement of the axle 52, as viewed in FIGURES 3 and 4, through the engagement of the driving pawl 108 with the pin 94, the arms 98, connecting link 140 and lever arm 132. As the cylinder 154 approaches its uppermost position, as shown in FIGURE 4, arm 216 fixed thereto will engage the upper collar 212, thus moving the actuating rod 210 upwardly until the effective toggle linkage provided by the bell crank arm 204 and spring 206 moves into its opposite over-center relationship. When the bell crank is thus moved into its opposite limiting position, the upper bifurcation of the arm 202 thereof and the action of spring 188 will effect movement of the valve member 182 into its lowermost position, interrupting the communication of the source of water under pressure to the cylinder and communicating the cylinder to the outlet opening 196. The water in the cylinder is thus free to discharge through the outlet opening 196 by passing through the hollow piston rod 166, the passage 172 in block 168, the central chamber 174 of the valve housing and through valve seat 178.

As the cylinder 154 moves downwardly from its uppermost position as the result of the discharge of water therefrom, the forward portion of the lever 130 will move from its uppermost position, shown in FIGURE 4 toward its lowermost position shown in FIGURE 3 which, in turn, effects a clockwise movement of the driving pawl; as viewed in FIGURES 3 and 4, through the lever arm 132, connecting link 140 and pawl carrying arms 98. Since the axle 52 is prevented from moving in a clockwise direction, as viewed in FIGURES 3 and 4, by the idler pawl 142, the clockwise movement of the drive pawl 108 will result in the same camming over the adjacent pins 94 until the same reaches its limiting position, as shown in FIGURE 3, in engagement with an adjacent pin.

As the cylinder 154 approaches its lowermost position, the arm 216 fixed thereto will engage the lower collar 214 on the actuating rod 210 moving the latter down which, in turn, imparts a counterclockwise pivotal movement to the bell crank 194, as viewed in FIGURES 3 and 4, until the effective toggle linkage provided by the arm 204 and spring 206 moves into the opposite over-center position. In this position, the valve member 182 is moved into an upper position by the lower bifurcation of arm 202 against the action of spring 188, thus discontinuing the discharge of the water from the cylinder 154 and completing the cycle.

It will be noted that with the arrangement described above the idler pawl 142 serves to prevent rearward movement of the vehicle when the driving pawl 108 is out of engagement with the pins 94 during its return stroke. Thus, if the vehicle is moving forwardly up an incline, the idler pawl 142 will prevent the same from moving rearwardly down the incline. It will be understood, however, that where the vehicle is moving forwardly down an incline, no such positive means is provided for preventing the wheels from turning. However, since in the operation of the apparatus, forward movement of the vehicle in operation under the action of the propelling mechanism 20 is always accompanied by a dragging movement of the hose 16 filled with water, it has been found that, under most conditions, the drag of the hose is sufficient to prevent forward movement even on a downward incline except under the positive stroke of the propelling mechanism 20.

FURROW FOLLOWER STEERING ASSEMBLY

As best shown in FIGURES 1, 2 and 5, the furrow follower steering assembly 22 comprises a rectangular frame assembly, generally indicated at 218, including a pair of horizontally spaced longitudinally extending frame members 220 and 222, rigidly interconnected at their forward ends by a transversely extending frame member 224. A rearward transverse frame member 226 is rigidly connected between the rear end portions of the longitudinal frame members 220 and 222 at a position spaced forwardly of the rear ends thereof. The rearward extremities of the longitudinal frame members are pivotally connected, as by pins 228 to the lower ends of the legs of an inverted U-shaped frame member 230. The upper ends of the legs of the U-shaped member are connected to the yoke of the front steerable wheel as by a pair of bars 232, the lower ends of the legs being connected to the lower ends of the yoke as by braces 234. The frame assembly 218 is thus mounted for swinging movement in a horizontal plane with the front wheel about the vertical steering axis of the latter and is swingable in a vertical plane about the axis of the pins 228 independent of the movement of the steerable front wheel. A conventional drawbar hitch clevis 236 is fixedly secured to the central portion of the forward transverse frame member 224 to permit the entire apparatus 10 to be moved in trail-behind relation to the tractor T or the like.

Mounted for vertical movement with respect to the frame assembly 218 adjacent the forward end thereof is a furrow following guide wheel 238. To this end, the wheel 238 is rotatably mounted on a stub shaft 240 fixed to one end of an arm 242, the opposite end of which is pivotally mounted between a pair of plates 244. The plates 244 are fixed to a transverse bar 246, as by welding or the like, which, in turn, is secured to the longitudinal frame members adjacent the forward end portion thereof, as by a pair of upstanding plates 248. Pivotally mounted between the plates 244, as by trunnions 250, is an internally threaded sleeve 252 within which is engaged the threaded rear end portion of a crank member 254. The rearward extremity of the crank is swivelly connected to a bifurcated clevis 256 which, in turn, is pivotally connected to the upper end of a bar 258, the lower end of which is fixedly secured to the wheel carrying arm 242 intermediate the ends thereof. It will be seen that by turning the crank member 254 the furrow following guide wheel 238 will be swung vertically with respect to the frame assembly 218.

The furrow opener assembly 24 is carried by the frame assembly 218 in a position rearwardly of the furrow following wheel 238 for vertical movement with respect to the frame assembly. To this end, the furrow opener assembly 24 includes a double mold board plow bottom 260 of conventional construction fixed, in conventional fashion, to the lower end of a generally L-shaped plow standard 262. Preferably, a conventional colter 264 is mounted on the plow standard in advance of the plow bottom 260, as by an arm 266 or the like carrying the colter at its lower end and having its upper end suitably clamped to the plow standard.

The upper forward portion of the plow standard is clamped in conventional fashion to the central portion of a transverse tool bar 268 the ends of which are fixed to the rear ends of a pair of forwardly extending mounting arms 270. The forward ends of the arms 270 are pivoted to the frame assembly 218, as indicated at 272, to permit the plow bottom to be raised and lowered with respect to the frame.

The plow bottom 260 is raised and lowered by a conventional screw jack assembly 276 connected between the plate 248 and the upper end of an arm 278, the lower end of which is fixed to the forward end of the adjacent mounting arm 270. The screw jack assembly 276 includes a reversing ratchet type actuating lever for effecting the raising and lowering movement in conventional fashion.

The plow bottom 260 is operable to form a furrow when the apparatus 10 is connected with a tractor or the like by engagement of the hitch clevis 236 with the draw bar of the tractor. During the furrow forming operation, the plow bottom 260 is actuated into its lowered position and the furrow following wheel is preferably disposed in its raised position. In this regard, it will be noted that during the formation of the furrow, wheel 46 of the vehicle follows almost immediately in the furrow as it is formed by the plow bottom. In this way the wheel 46 serves to pack any loose dirt that may tend to fall back into the furrow and generally smooths the furrow into a firm condition which is particularly suited for subsequent furrow following operations. After the furrow has been formed, the plow bottom 260 is raised and the wheel 238 lowered to permit the latter to guide or steer the vehicle along the furrow during its forward movement by propelling mechanism 20.

HOSE HANDLING MEANS AND SPRINKLER ASSEMBLY

The hose handling means 26 includes a reel assembly, generally indicated at 280, around which the hose 16 is wound when the apparatus is transported from one position to another. Mounted on the vehicle frame rearwardly of the reel assembly is a hose collapsing assembly 282 which serves to guide the hose as it is wound up onto the reel assembly 280 and to collapse or flatten the same so as to insure that any water contained therein will be expelled from the hose as it is wound on the reel assembly. To aid in feeding the collapsed hose on to the reel assembly, an intermediate hose guiding assembly 284 is mounted between the reel assembly and the hose collapsing assembly. The hose collapsing assembly 282 and hose guiding assembly 284 also are useful when the hose is being unwound or paid out from the reel assembly. In order that the hose may be paid out from the reel assembly and deposited in a position laterally spaced from the longitudinal axis of the vehicle frame, there is provided a pivoted rear hose guide assembly, generally indicated at 286.

The reel assembly 280 not only functions as a storage means for the hose when the latter is in a collapsed wound condition for transportation, but, in addition, functions as a means through which the forward movement of the vehicle frame is transmitted to the hose during the sprinkling operation so that the hose will be moved with the movement of the vehicle.

In order to enjoy the benefits of the present invention most efficiently, it is preferable to utilize a specially constructed hose. When dealing with a hose of a length of approximately 600′ and a diameter of approximately 4″, it will be appreciated that the problem of disposing such a length of non-collapsible hose into a transportable bundle is virtually an insurmountable task. The weight of the contained water alone (approximately 3600 pounds) in such a length of hose would present problems of handling which would render the operation impractical. Consequently, the hose of the present invention must not only be flexible so that it can be wound up into a compact bundle for transportation, but it must also be collapsible so that during the winding operation substantially all of the water contained within the hose can be squeezed out. In order to most efficiently carry out this concept the hose should be collapsible throughout its length, that is, it should be in one continuous length free from rigid non-collapsible couplings. Consequently, the hose should be capable of being repaired, in the event it is damaged, in such a way that the coupling of the repaired part is collapsible. The hose desirably should be smooth along its outer periphery so that it can be pulled along the ground relatively easily and, at the same time, be abrasive resistant. It should not mildew when, for example, it is wound up into its transportable bundle formation, and finally, it should be relatively inexpensive.

One embodiment of such a hose is preferably made from a length of woven material imbedded between a relatively thick inner layer and a relatively thin outer layer of a thermoplastic resin with the longitudinal marginal edges of the imbedded woven material heat sealed in overlapping relation. A seamless hose construction may also be utilized to good advantage in which the woven material is formed in sleeve formation about a preformed inner tubular layer and a subsequent outer layer is then applied over the woven material.

In a preferred embodiment the diameter of the hose when expanded is 3″ or 4″ and when collapsed in flat condition has a thickness of approximately 0.4″. The woven fabric used as reinforcing may be made of any suitable material, a preferred material being nylon. The thermoplastic material between which the woven material is embedded may be resin, rubber or the like.

Referring now more particularly to FIGURES 12–14, it will be noted that the reel assembly 280 includes a central hub structure 292 and a pair of side structures 294 spaced apart a distance of the order of the width of the collapsed hose to receive the same therebetween.

The hub structure 292 includes an inner tubular member 296 having sleeve bearing elements 298 in the ends thereof which rotatably engage a shaft 300 journaled on the frame members 30 and 32, as by bearings 302. Rigidly secured to the central portion of the tubular member 296 is a pair of axially spaced radially extending sector shaped plates 304 having an arcuate plate 306 fixedly secured across their peripheries. As shown in FIGURE 14, the plate 306 has an arcuate extent somewhat over 180° and one end thereof is curved inwardly, as indicated at 308 to provide an initial hose engaging surface. The side structures 294 are each in the form of a disc-shaped plate 310 connected with the hub plates 304, as by a series of bolts 312 or the like extending therethrough and through outer reinforcing plates 314. The outer periphery of each side plate 310 is connected with the associated end of the tubular member 296 by a plurality of circumferentially spaced brace members 316, the inner ends of which are bolted or otherwise secured to an end disc member 318 which, in turn, is bolted or otherwise secured to the adjacent end of the tubular member 296. The outer end of each brace member is welded to the central portion of a transverse angle iron 320 which is, in turn, secured, as by bolts or the like, to the outer periphery of the associated side plate 310.

As stated above, the arcuate plate 306 has an extent of somewhat over 180° and in addition to the surface 308 provides a hose engaging surface 322 which is arcuate about the axis of the shaft 300. Mounted within the remaining portion of the cylindrical plane defined by the surface 322 is a tubular hose fitting 324. To this end, a cross-member 326 of generally U-shape configuration has the end of one of its legs rigidly secured to one of the sector-shaped plates 304 and the end of its other leg bolted or otherwise detachably connected to one end of a strap 328. The opposite end of the strap 328 is likewise bolted to an end portion of the opposite sector-shaped plate 304. The central portion of the strap 328 and an aligned portion of the opposite plate 304 are apertured to pivotally receive a pair of diametrically opposed trunnions 330 extending outwardly from the central periphery of the fitting 324. The bight portion of the U-shaped cross-member has an outer arcuate hose engaging surface 332 disposed generally within the cylindrical plane of the surface 322. As best shown in FIGURE 14, the side plate 310 adjacent the strap 328 is provided with an opening 334 through which access to the tubular fitting 324 is obtained.

The tubular fitting 324 is provided with a quick coupling means 336 for detachably engaging and securing a fitting 338 on one end of the hose 16. As best shown in FIGURES 15 and 16, the tubular fitting 324 is provided with a counter bore 340 formed in one end portion thereof, the counterbore 342 formed in the outer end portion thereof. Formed in the inner portion of the first counterbore 340 is an annular groove 344 which is adapted to receive an annular sealing member 346, the inner periphery of which is adapted to engage an outer cylindrical surface 348 formed on one end portion of the host fitting 338.

The hose fitting 338 is engaged with the end of the end of the hose 16 at the opposite end portion in conventional fashion and includes a central portion of enlarged thickness having an annular groove 350 formed in the outer periphery thereof adapted to selectively receive the inner end portion of a series of balls 352 made of a hard material, such as steel or the like, mounted for radial movement within a series of circumferentially spaced frustoconical openings 354 communicating with the second counterbore 342 of the central tubular fitting 342. The balls 352 are forced radially inwardly with respect to the annular groove 350 by a sleeve 356 disposed in surrounding relation to the adjacent end portion of the tubular fitting and mounted for limited rotational movement with respect thereto. To this end, the sleeve is fitted with a pair of conventional spring pressed ball units 358 at diametrically opposed positions. The casing of each unit 358 extends inwardly of the sleeve into an arcuate slot 360 of slightly less than 60° arcuate extent. The bottom surface of each slot upon which the ball of the associated unit 358 rolls is formed with recesses 359 at each end into which the balls extend to index the sleeve in either limiting position.

As best shown in FIGURE 16, the inner periphery of the sleeve is formed with a series of circumferentially spaced wedge surfaces 362 which, when rotatably engaged with the balls 352, forces the latter to move radially inwardly with respect to the groove 350. The sleeve is provided with a radially extending handle 364 for effecting the turning movement thereof. It will be understood that the ball and groove arrangement provide a quick disconnect coupling between the tubular fitting 324 and the hose fitting 338 in a manner which is generally conventional.

The opposite end portion of the tubular fitting 324 is adapted to be connected with a hose fitting 366 which likewise is provided with a quick disconnect coupling means 368. As shown, the outer periphery of the opposite end portion of the tubular fitting 324 is provided with an annular groove 370 adapted to receive a series of balls 372 carried in frustoconical openings 374 formed in the adjacent end portion of the fitting 366. As before, a sleeve 376 is disposed in surrounding relation to the outer periphery of the adjacent end portion of the fitting 366 and, as shown, is slidably mounted thereon for movement between a position retaining the balls 372 in engagement with the groove 370 and a releasing position wherein a recess 378 formed in the outer end of the sleeve 376 is disposed in radial alignment with the balls. It will be noted that the opposite end portion of the sleeve 376 is provided with a counterbore 380 within which a coil spring 382 is mounted which serves to resiliently bias the sleeve into its engaged position wherein the recess 378 engages snap ring 384.

The adjacent extremity of the opposite end portion of the tubular fitting 324 is formed with a reduced diameter and the outer cylindrical peripheral surface thereof is adapted to receive the inner periphery of an annular seal 386 disposed within a groove 388 formed in the adjacent interior periphery of the fitting 366.

The fitting 366 is secured to one end of a conduit or length of hose 390, the opposite end of which is secured to the lower end of an elongated riser pipe 392, forming a part of the sprinkler assembly 14. Preferably, the conduit 390 is connected to the riser pipe by means of a T-fitting 394, one branch of which is of reduced diameter and is connected with the inlet 192 of the reversing valve mechanism 88 as by a valve 396 and hose 398 connected in series. Preferably, the riser pipe 392 is of a substantial vertical height and in order to permit the apparatus to be transported through roads and other places where low overhead obstructions may be present, the riser pipe is preferably mounted for movement between a normally operative vertically extending position and a lowered generally horizontal transport position. To this end, there is provided on the riser pipe at a position spaced upwardly from the lower end thereof a pair of spaced upper and lower lugs 400 and 402. The lower lug 402 is pivoted to the upper end portion of a pair of parallel mounting arms 404, the lower ends of which are fixedly secured to the forward end of the vehicle frame.

The riser pipe 392 is moved between its vertically extending operative position and horizontally extending transport position by a cable and winch assembly, generally indicated at 406, of conventional construction. As shown, the winch is suitably mounted on the forward end of the vehicle and has one end of the cable wound thereabout, the opposite end portion of which passes over a pulley 408, journaled between the upper ends of the mounting arms 404, and the extremity of which is connected to the upper lug 400. The riser pipe is maintained in its vertically extending operative position by suitably pinning the upper lugs to the mounting arms and is further stabilized by a series of guy wires 410 connected at their upper ends to the upper end of the riser pipe and at their lower ends to the vehicle frame. The riser pipe is retained in its horizontally extending lower position by means of a standard 412 secured at its lower end to the rearward end of the vehicle frame and having a pair of upwardly diverging arms 414 secured to the upper end thereof for receiving the outer end portion of the riser pipe.

It will be understood that the upper end of the riser pipe has a sprinkler head 416 mounted thereon. Preferably, the sprinkler head 416 is of the step-by-step rotary type actuated by an oscillating impulse arm, in conventional fashion.

The high riser pipe arrangement shown in the drawings and described above is particularly suited for use in fields of high mature plants such as fruit trees, tobacco, corn, etc. A relatively short fixed riser pipe may be used where plant clearance is not a factor in which case the guy wires will not be necessary nor will it be necessary to provide for movement of the riser pipe into a lowered transport position.

It will be noted that when the sprinkler head 416 is in operation, the conduit 390 is connected with the tubular fitting 324 in the manner shown in FIGURES 1 and 14 and the pull of the hose 16 will tend to rotate the reel assembly 280 in a counterclockwise direction as viewed in FIGURE 14. In actual sprinkling operation, the tendency of the reel assembly to rotate in response to the pull of the hose is resisted by a locking assembly generally indicated at 418, as shown in FIGURES 17 and 18. The locking assembly 418 acts in one direction only so that when the sprinkling operation has been completed, the hose 16 may be wound up on the reel assembly 280 in a clockwise direction as viewed in FIGURE 14, after the fitting 366 has been disconnected, the locking mechanism 418 automatically disengaging in response to the initial travel clockwise movement of the reel assembly 280.

Power operated means are provided for rotating the reel to wind up the hose. The power source is preferably in the form of an internal combustion engine 419 of conventional design of the type having a built-in clutch and actuating lever whereby the output shaft may be selectively rendered inoperable while the engine is running. As shown, internal combustion engine 419 is mounted on the forward portion of the vehicle frame and is connected, as through a belt and pulley assembly 420 of conventional design to a speed reducing transmission unit, generally indicated at 422, also of conventional construction. The output shaft of the transmission is drivingly connected with the shaft 300 and means is provided for selectively drivingly engaging the shaft 300 with the reel assembly 280 so that the engine 419 will be effective to wind up the hose 16 on the reel and for disengaging the power means and providing the reel with a braking action so that the hose can be unwound or paid out from the reel in a controlled manner. While this selective operable means may take many forms, as shown, the shaft 300 is formed with a radial bore 424 which is adapted to register with a circular opening 426 formed in the member 296. The shaft 300 is thus selectively fixed to the reel by inserting a pin 428 into registering opening 426 and bore 424.

When the pin 428 is removed, the reel assembly is free to rotate on the shaft 300 under the control of an adjustable brake assembly, generally indicated at 430. As shown in FIGURE 13, the brake assembly 430 includes a central brake sleeve 432 suitably fixed to the shaft 300 adjacent one end disc member 318, as by a key 434 or the like. A pair of arcuate brake arms 436 are pivotally mounted at one of their ends to the adjacent disc member 318, as indicated at 438 and the opposite ends thereof are provided with generally radially extending spaced lugs 440 interconnected by a bolt assembly 442. The inner arcuate surfaces of the brake arms 436 are provided with arcuate brake liners 444 which are adapted to engage the peripheral surface of the brake sleeve 432. It will be understood that by adjusting the bolt assembly 442, the brake assembly 430 may be adjusted to control the frictional engagement between the reel assembly 280 and the shaft 300.

As best shown in FIGURES 17 and 18, the reel locking assembly 418 includes a stop pin 446 adapted to engage within a pair of tangentially facing notches 448 formed in the outwardly projecting ends of a pair of lugs 450 secured to the outer periphery of the reel side plates 310 and extending radially outwardly therefrom. An eye member 452 is rotatably mounted on the central portion of the pin 446 and has one end of a chain 454 connected thereto, the opposite end portion of which is selectively connected to a chain receiving bracket 456 secured to an intermediate cross-member of the vehicle frame.

As shown in FIGURE 18, the ends of the lock pin 446 extend outwardly beyond the lugs 450 in a position to be engaged by a pair of cam plates 458 fixedly secured to the cross member adjacent the bracket 456. Each of the cam plates includes an upwardly facing curved cam surface 460 disposed in the path of movement of the ends of the lock pin. It can be seen that the connection of the chain 454 between the bracket 456 and eye 452 when the lock pin 446 is engaged within the notches 448 of lugs 450 will prevent clockwise rotational movement of the reel assembly as viewed in FIGURE 17. However, due to the flexibility of the chain, counterclockwise movement can take place under the operation of the engine 419 and transmission unit 420. During the first portion of such counterclockwise rotational movement, the ends of the lock pin will engage the cam surfaces 460 preventing further movement of the lock pin with the lugs, so that as the reel assembly continues to move in a counterclockwise direction, the lock pin will effectively be removed from the grooves in the lugs and move down the cam surfaces 460 into the lower portion thereof out of the path of movement of the lugs, thus permitting continued counterclockwise rotational movement of the reel assembly under the operation of the engine and transmission unit.

In order to insure that the lock pin 446 is moved outwardly of the lugs, suitable biasing means is provided which, as shown, is in the form of a movable weight unit, generally indicated at 462. The unit 462 includes an upright tubular housing 464 of a size to receive a weight member 466 therein. The weight member is connected with one end of a cord 468 which extends upwardly therefrom and then around an upper pulley 470 rotatably mounted in the upper end of the tubular housing 464. From the upper pulley 470 the cord extends through a guide tube 472 suitably secured to the interior wall of the tubular housing and then around a lower pulley 474. From the lower pulley 474, the cord 468 extends outwardly of the tubular housing 464 through a suitable opening 476 and the outer extremity of the cord is connected to the chain 454 adjacent the pin 446.

It will be noted that the cord 468 of the weight unit can be readily extended when the pin is moved into locking engagement with the lugs 450 and will maintain a continuous biasing action on the pin throughout the movement of the latter from its locking position until the latter engages the cam plates 458 at which time the weigh 466 through the cord 468 serves to positively bias the pin away from the outer periphery of the reel.

Referring more particularly to FIGURES 19 and 20, the hose collapsing assembly 282 preferably comprises a rigid rectangular frame 478 which is fixedly mounted at the rear of the vehicle frame in a position below the rear cross-member 36 as by a bracket 480. Journaled in the rearward portion of the rectangular frame 478 is a pair of upright rollers 482 spaced apart a distance of the order of the collapsed diameter of the hose 16. A lower horizontal roller 484 is rotatably mounted between the sides of the rectangular frame forwardly of the vertical rollers 482. Formed in the sides of the frame 478 above the roller 484 is a pair of vertical slots 486 within which the end portions of a shaft 488 are slidably mounted. An upper roller 490 is journaled on the shaft 488 between the sides of the frame 478 and the ends of the shaft extend outwardly of the sides of the frame 478 and are journaled in the lower ends of the legs of an inverted U-shaped yokelike member 492. Disposed above the bight portion of the U-shaped member 492 is a horizontal bar 494 having a coil spring 496 connected between each end thereof and the adjacent bight portion of the U-snaped member 492. Preferably, a stud 498 extends through each end of the plate 494 and the associated coil spring 496 and is threadedly engaged in the adjacent bight portion of the U-shaped member 492. The studs 498 serve as guide members which permit the U-shaped member carrying roller 490 to be moved upwardly with respect to the bar 494. The central portion of the bar 494 and the central bight portion of the U-shaped member 492 are provided with aligned apertures for receiving a lower stem portion 500 and an adjusting rod having an upper portion 502 which is threaded and engaged within a bracket 504 vixed to the cross-member 36. The upper end of the adjustment rod 502 is provided with an actuating handle 506. It will be seen that by turning the handle 506, the actuating rod will be moved vertically with respect to the bracket 504 which, in turn, will cause a vertical movement of the roller 490, U-shaped member 492 and plate 494 with respect to the roller frame 478. In this way, the upper roller 490 is moved between an open position spaced apart from the lower roller a distance of the order of the collapsed diameter of the hose 16 and a lower collapsing position adjacent the lower roller. When the upper roller 490 is in the latter position, it will be noted that the spring connection between the U-shaped member 492 and the bar 494 will permit the upper roller to be biased upwardly in the event that an obstruction in the hose is encountered.

The intermediate hose guiding assembly 284 is mounted between the reel assembly 280 and the hose collapsing assembly 282 in a position of longitudinal alignment and includes a rectangular frame 508 having a pair of vertically spaced horizontally extending rollers 510 and a pair of horizontally spaced vertically extending rollers 512 suitably journaled therein.

The pivoted rear hose guide assembly 286 includes a rectangular frame 514 having a pair of vertically spaced horizontally extending rollers 516 and a pair of horizontally spaced vertically extending rollers 518 journaled therein, similar to the assembly 284. However, this assembly is mounted for movement into two different lateral operative positions and into a raised transport position. To this end, the frame 514 is fixedly secured to the rear end of a mounting arm assembly 520 made up of two arm sections 522 and 524 pivotally connected together, as indicated at 526 and provided with registering apertures for receiving a pin 528 which, when engaged in the apertures, serves to retain the arm sections in rigid alignment and, when removed, permit the arm sections to pivot with respect to each other.

The forward end of the forward arm section 522 is connected to the central portion of the rear vehicle frame member 36 as by a universal joint 530 providing for horizontal swinging movement about a vertical axis and vertical swinging movement about a horizontal axis.

The mounting arm assembly 520 is thus swingable horizontally into either one of two operative positions wherein the hose guide assembly is disposed laterally outwardly of the sides as shown in dotted lines in FIGURE 5 and is retained therein by a flexible member 532, such as a wire rope or the like. One end of the flexible member is connected to an eye bolt 534 secured to the standard 412 in alignment with the vertical pivotal axis of the universal joint 530 and its opposite end is connected to an eye bolt 536 secured to the rearward end portion of the forward arm section 522. The flexible member 532 thus serves to limit the downward vertical swinging movement of the mounting arm assembly with respect to the frame to a horizontal position but permits a horizontal swinging movement thereof as well as an upper vertical swinging movement thereof. The rearward end of the mounting arm assembly 520 is pivotally connected to the rearward end of a guide rod 538, the forward end of which is selectively pivotally connected to one of a pair of pins 540 fixedly secured to the sides of the rear frame member to selectively fixedly retain the roller unit in either of its lateral operative positions.

The roller unit is retained in its transport position by removing the pin 528 from its position of connection between the arm sections and inserting the pin between the apertured rear ends of a pair of bracket plates 542 extending rearwardly from the upper end portion of the standard after having pivoted the foward arm section upwardly until the pin receiving aperture thereof is aligned with the apertures of the bracket plates.

WATER SHUTOFF MECHANISM

The apparatus of the present invention is preferably provided with means for shutting off the flow of water at least to the water pressure actuating drive mechanism when the vehicle has reached a predetermined position in its path of travel. While any suitable means may be utilized for accomplishing this purpose, one embodiment of a water shutoff device, generally indicated at 544, is shown in FIGURES 21 and 22. The shutoff device 544 is adapted to be installed between the source of water under pressure and the end of the hose 16 opposite that connected with the reel assembly 280 and is operable to shut off the water at its source so as to prevent further actuation of the water pressure actuated drive mechanism 20 and the sprinkler assembly 14 when the vehicle reaches the end of its path of travel.

The device 544 includes an adaptor pipe 546 arranged to be connected with the outlet of the water pressure source, as for example, an underground pipe fitting or a hose fitting. Connected with the adaptor pipe is a water pressure actuated control valve 548. The valve 548 is of conventional design and functions to divert a portion of the water flowing therethrough to establish a pilot pressure in a line 550. The valve includes the usual valve member movable between an open position permitting flow therethrough into a closed position shutting off the the flow of water therethrough in response to the communication of the pilot pressure to a pilot pressure responsive valve member actuating mechanism embodied in the valve 458. Communication of the pilot pressure in line 550 to the valve member actuating mechanism of the valve 548 is controlled by a pilot valve 552 connected in the line 550 and normally disposed in a closed position so as to prevent communication of the pilot pressure with the valve 548 but movable into an open position to communicate the pilot pressure with the valve 548.

The pilot valve 552 is mounted within the central portion of a hose receiving frame, generally indicated at 554. The frame includes a bottom plate 556 of generally triangular configuration having concavely arcuate sides. The frame also includes arcuate side members 558 fixedly secured to the arcuate side edges of the bottom plate and extending upwardly therefrom. The narrow end of the frame 554 is adapted to be fixedly secured to a base unit 560 on which the valve 548 is fixedly mounted. The base unit preferably includes the bottom skid plate 562 having a pair of ground penetrating legs 564 extending downwardly therefrom.

The frame 554 at the wide ends of the members 558 is provided with a pair of ground penetrating stakes 556 which are fixedly secured as by welding or the like to the adjacent end portions of the side members 558. Preferably, the straight end of the bottom plate 556 is bent downwardly, as indicated at 568, and the side members 558 extend outwardly thereof and are rounded at their extremities, as indicated at 570. A horizontally extending strap 572 is rigidly connected between the upper ends of the stakes 566 and serves to insure that the hose will remain in engagement with the bottom plate 556 of the frame 554.

As shown in FIGURES 21 and 22, the hose 16 is adapted to be fed between the strap 572, bottom plate 556 and side members 558 and is connected with the valve 548, as by a conventional quick disconnect fitting indicated at 574. It will be noted that the pilot valve 552 includes a spring pressed actuator 576 which extends upwardly from the central portion of the bottom plate 556 in a position to be engaged and depressed when the hose 16 is moved from the dotted line position shown in FIGURE 21 to the solid line position shown therein. This movement of the hose 16 will occur when the vehicle reaches the end of its path of travel as will be more fully explained hereinafter. Consequently, the shutoff device 544 is operable only when a full travel of the apparatus is contemplated.

A modified form of water shutoff device, generally indicated at 578, is shown applied to the present apparatus in FIGURES 1, 2 and 5. Since the device 578 is not only capable of operation in full travel but partial travel as well it is generally preferred. As best shown in FIGURE 23, the shutoff device 578 includes an arcuate bumper member 580 having an elongated rigid bar 582 extending rearwardly therefrom. The elongated bar 582 is mounted for longitudinal sliding movement on the forward end of the apparatus as, for example, by a plate 584 mounted on the upper surface of the frame member 224 in spaced relation thereto as by a pair of transversely spaced pins 586 carrying suitable rollers 588 between the frame member 224 and the plate 584.

In this way, the bumper 580 is maintained in a position forwardly of the apparatus so as to engage a stake 590 positioned within the furrow defining the path of travel of the apparatus. As shown in FIGURE 23, the stake includes a lower end 592 which is adapted to penetrate into the ground up to the level of a pair of lower guide rods 594 fixedly secured to the stake and extending outwardly therefrom in diametrically opposed relation. If desired, a similar pair of upper rods 595 may be provided at the upper end of the stake for the purpose of facilitating removal from the ground.

It will be understood that when the bumper 580 engages the stake 590 the elongated bar 582 will be moved rearwardly. The rearward end of the bar 582 is connected with an actuating lever 596 of a pilot valve 598 similar to the valve 552 previously described. The movement of the actuating lever 596 in response to the rearward movement of the elongated bar 582 will move the pilot valve from its normally closed position to an open position so as to communicate the pilot pressure in a line 600 connected between a shutoff valve 602, similar to the valve 548 previously described. The valve 602 is preferably connected between the outlet end of the conduit 390 and the riser pipe 392, so that when the pilot valve 598 is opened the flow of water both to the water pressure actuating driving mechanism and the sprinkler assembly will be shut off. Alternatively, the valve 602 may be connected within the hose 398 downstream from the valve mechanism 88, so that when the pilot valve 598 is open only the flow of water to the water pressure actuated driving mechanism will be shut off.

OPERATION

In normal operation, the apparatus of the present invention is adapted to operate in a field along a generally straight path, the entire field being irrigated by operation of the apparatus through a plurality of parallel straight paths.

The cycle of operation in one path will now be described assuming that there is no pre-existing furrow formed in the path. In actual operation, once a furrow has been formed it is preferable to perform additional cycles of operation utilizing the pre-existing furrow without the necessity of forming a new furrow.

Referring now more particularly to FIGURE 24, the apparatus of the present invention is moved into the field by the tractor T with the apparatus in its transport position. Except for the furrow opener assembly 24, this position of the parts is generally shown in FIGURE 2. The apparatus is moved by the tractor to a position spaced from the source of water under pressure a distance which is generally equal to the length of the hose 16 as, for example, 600'. At this position, the furrow opener assembly 24 is lowered into ground engagement as shown in FIGURE 2 and the tractor is operated to move the apparatus generally toward the source of water under pressure so as to form a first portion of a furrow $F^1$. When the tractor has moved the apparatus to a position as shown in solid lines in FIGURE 24, the end of the hose 16 which is wound up on the reel assembly 280 is fed rearwardly through the intermediate hose guide assembly 284, the hose collapsing assembly 282, and the pivoted rear hose guide assembly 286, the later being moved into its outwardly extending operative position to the side of the frame adjacent the water source as shown in FIGURE 24. The end of the hose is then engaged under the bar 572 of the shutoff device 544 and finally connected with the valve 548, when the device 544 is used. Where the bumper shutoff device 578 is used, the stake 590 should be properly positioned in the furrow at the point where it is desired to stop the cycle of operation.

The tractor is then operated to move the apparatus in a direction away from the water source so as to form a second furrow portion $F^2$ which constitutes a continuation of the first portion $F^1$. During this movement, the hose 16 is paid out from the reel assembly 280 and the pivoted rear hose guide assembly 286 serves to lay the hose on the ground in a position parallel to the furrow out of the path of movement of the vehicle assembly 12, as shown in dotted lines in FIGURE 25. It will be understood that the hose 16 is paid out from the reel assembly 280 during this movement with the reel assembly under the control of the brake assembly 430, the pin 428 being removed from the registering opening 426 and bore 424. The controlled rotation of the reel assembly 482 by the brake assembly 430 is important for the reason that if the reel assembly were permitted to have free rotational movement and during the pay out travel of the vehicle assembly it became necessary for the tractor operator to stop, the reel would continue to rotate and pay out a good portion of the hose in a haphazard condition on the portion of the field where the vehicle assembly was stopped.

Also, prior to the commencement of the movement of the apparatus to pay out the hose, coupling means 336 is actuated into its releasing position so that when the vehicle frame has been moved away from the water source a distance equal to the length of the hose, the hose will simply pull off of the tubular fitting 324 as shown in FIGURE 26. This action greatly facilitates the operation in that it is not necessary for the tractor operator to stop the tractor at a position just before the entire hose is paid out and then get off of the tractor and uncouple the end of the hose.

After the hose has been laid on the ground in parallel relation as aforesaid, the tractor operator then turns the entire vehicle apparatus around so that the furrow follower steering assembly 22 is engaged forwardly within the end of the furrow section $F^2$. The adjacent end of the hose is then fed through the hose guide assemblies 282 and 284 (in opened position) and connected with the tubular fitting 324. Next, locking pin 446 is engaged within lug notches 448 and chain 454 is engaged with the bracket 456. Finally, the fitting 366 at the end of conduit 390 is engaged with the tubular fitting 324, as shown in FIGURE 14 so that the reel assembly 280, by virtue of the locking assembly 418 will transmit the forward movement of the vehicle assembly 12 to the hose 16. It will be noted from FIGURE 14 that the arrangement is such that a smooth path of flow of water through the tubular fitting 324 is provided.

With the apparatus in the condition indicated above and shown in FIGURE 1, the furrow opener 260 having been moved to a raised position, the furrow guide wheel 238 lowered with respect to the frame 222, the drive pawl 108 and anti-reverse pawl 142 of the assembly 82 released into the path of movement of the pins 94, and the lever 73 of the ratchet assembly 56 moved into its operative position and held therein by thumbscrew 78, the sprinkling operation of the apparatus 10 is commenced by communicating the source of water under pressure to the hose 16. The operation of the apparatus is then commenced without the necessity of an attendant, the tractor operator being available for other work. It will be understood that the furrow follower steering assembly 22 will guide the vehicle assembly 12 along the path defined by the furrow sections F¹ and F² and that the water pressure actuated propelling mechanism 20 will effect movement of the vehicle assembly along this path while water is sprayed from the sprinkler assembly 14. During this movement, the hose will be pulled by the vehicle assembly, in a condition in which there is a progressively increasing portion extending rearwardly of the vehicle assembly and a progressively decreasing portion extending from the source parallel with the furrow in a direction opposite to the direction of movement of the vehicle assembly. Eventually, the vehicle assembly will reach a position adjacent the end of the furrow section F¹ wherein the opposite end of the hose 16 will be moved from the dotted line position shown in FIGURE 25 to the solid line position shown therein. This corresponds to a movement of the hose from the solid line position in FIGURE 21 to the dotted line position shown therein. This movement of the end of the hose actuates the shutoff device 544 in the manner previously described to cut off the flow of water from the source. When the water is shut off at the source, forward movement of the vehicle frame will, of course, stop as will the flow of water outwardly of the sprinkler assembly.

It will be understood that where the shutoff device 578 is used, the stake 590 is mounted in the furrow at the position where it is desired to stop the forward travel of the vehicle assembly. This position may be either at the end of the furrow or at a position between the end of the furrow and the water source. When the bumper 580 engages the stake 590, the flow of water to the water pressure actuated drive mechanism 20 will be shut off to stop the forward movement of the vehicle assembly. Depending upon whether the valve 602 is connected downstream or upstream from the riser pipe 392, the flow through the sprinkler mechanism 14 will be either shut off or continued in the manner previously described.

The cycle of operation is completed by winding up the hose on the reel assembly 280 to permit the apparatus to be moved by the tractor to a new path of movement in the field.

The manner in which the hose is wound up on the reel is an important feature of the present invention. It will be recognized that when dealing with a 4″ diameter hose having a length of the order of 600′ or the like, the weight of the water contained within the hose will be of the order of 3600 pounds. Consequently, when the vehicle assembly is stopped at the end of its path of travel, a large potential force is stored in the hose so much so that if the coupling means 336 were simply released at the end of the travel of the apparatus, the hose would fly away from the apparatus due to the energy stored therein presenting a dangerous condition. Rather than to alleviate this force by attempting to move the entire vehicle rearwardly, the reel assembly 280 of the present invention permits the hose 16 to be wound up without disconnecting the hose from the reel.

To this end, conduit 390 is first removed from the tubular fitting 324 by disengaging the quick disconnect coupling means 368. Next, pin 428 is engaged within opening 426 and bore 424 so that the reel is fixedly connected with the engine 419 to be rotated in a clockwise direction as viewed in FIGURES 14 and 27. To accomplish this engagement it may be necessary to first start the engine 419 with the clutch positioned to prevent rotation of the output shaft and to slowly engage the clutch until the opening 426 and bore are lined up as determined by suitable exterior indicia.

Finally, the handle 506 of the hose collapsing assembly 282 is turned to move the upper roller 490 into its lower position with respect to the lower roller 484. It will be understood that in some instances, where the position of the vehicle assembly at the end of the path of movement is at an elevation above the water source, the water in the hose will run out by gravity when the end of the hose is disconnected from the source. The hose collapsing assembly 282, however, will insure that the water will be removed as the hose is wound up on the reel assembly. On the other hand, where the vehicle ends up at an elevation lower than the water source, the hose collapsing assembly will force the water from the hose.

After the hose 16 has been disconnected from the water source, the engine 419 is actuated to commence the turning action of the reel assembly. In response to the initial turning action, the arcuate surface 308 provided by the hub structure will engage the portion of the hose adjacent the fitting 338. As best shown in FIGURE 27, the tubular fitting 324 will pivot in response to this engagement of the adjacent portion of the hose into a position wherein the axis of the tubular fitting 324 is generally tangential to the arcuate surface 308. It will be noted that this relationship insures that the subsequent turning action of the reel will transmit the force of the reel to the hose through the tubular fitting 324 and the hose fitting 338 in such a manner that the pull between the fitting 338 and hose 16 is generally uniform. It will also be noted that since the locking mechanism 418 is positively acting in only one direction, the reel assembly 280 is free to initially move in a clockwise direction as viewed in FIGURES 14 and 27 without a binding action provided by the locking mechanism. During the initial turning movement, the lock pin 446 is brought into engagement with the cam surfaces 460 so as to be removed from the notches 448, the weight unit 462 serving to insure that the pin 446 will be moved out of the path of the movement of the lugs 450 in response to the movement of the pin 446 out of the notches 448. It will also be understood that continued rotational movement of the reel assembly under the action of the engine 419 will serve to wind the hose 16 onto the reel 280 in a single roll, the side structures 294 being spaced apart a distance of the order of the width of the collapsed hose to insure that each successive winding of the hose will be upon the succeeding winding. It will also be understood that the initial loop of the roll will engage the hose engaging surface 322 of the hub structure 292 as well as the hose engaging surface 332 of the crossmember 326. When the entire hose 16 has been wound up on the reel, the motor 419 is disengaged and the apparatus 10 can than be transported to a new position of use after having locked the pawls 108 and 142 in their inoperative) position and moved and secured the ratchet assembly 56 into its inoperative position.

The apparatus 10 of the present invention is suitable for irrigating fields both small and large. An exemplary utilization of the present apparatus on a 40 acre plot approximately 1320′ x 1320′ would involve setting up a source of water under pressure to one side of the field at the midportion thereof approximately 120′ in from the side. Working from this outlet of the main water source the apparatus would be operated in a path parallel to the adjacent side, the sprinkler assembly 14 being adapted to spray in a diameter of approximately 320′. Subsequent operations at 180′ offset from the first were made, each time extending the source the required 180′. It is contemplated that the enitre field would require 7 different settings for the path of travel of the apparatus. Utilizing a 47-hour operation for each setting and a 25½′ per hour travel speed, a 3½″ application of water to the entire plot can be made in 14 days. A water source having a capacity of 200 gallons per minute with a discharge pressure of approximately 115 pounds per inch is sufficient for this purpose.

It will be understood that smaller field areas may be irrigated by the present process as well as larger. Another exemplary utilization of the present apparatus for a 145 acre plot could apply a 1.2 inch water cover in 10 days utilizing 20 different settings of the apparatus with 11 hours of operation for each setting.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles.

What is claimed:

1. A traveling irrigation sprinkler comprising a wheeled frame, sprinkler means carried by said frame, a water pressure actuated driving means on said frame for effecting movement of said frame along a predetermined path to be covered by water issuing from said sprinkler means, a length of flexible collapsible hose having one end adapted to be connected with a source of water under pressure, means connecting the other end of said hose with said sprinkler means and said driving means for effecting the operation of both sprinkler and driving means when said one end of the hose is connected with a source of water under pressure, a reel rotatably carried by said frame, and power means on said frame for effecting a rotational movement of said reel to wind up said hose thereon when the one end of said hose is disconnected from a source of water under pressure.

2. A traveling sprinkler as defined in claim 1 including hose collapsing roller means carried by said frame in a position to engage and collapse said hose as it is wound up on said reel.

3. A traveling sprinkler as defined in claim 1 wherein said sprinkler means comprises an elongated rigid pipe having a sprinkler head mounted on one end thereof, and means for mounting the opposite end portion of said rigid pipe on said frame for movement between a sprinkling position wherein said pipe extends generally vertically, and a transport position wherein said pipe extends generally horizontally.

4. A traveling sprinkler as defined in claim 3 including means for moving said pipe between said sprinkling and transport positions.

5. A traveling sprinkler as defined in claim 1 including means for shutting off the flow of water to said water pressure actuated driving mechanism in response to the movement of said frame along said path a predetermined distance.

6. A traveling sprinkler as defined in claim 5 wherein said water shutting off means comprises valve means between the source and said hose movable between opened and closed positions and means operable in response to the movement of the adjacent position of said hose in response to the movement of said frame toward the end of said path for effecting a movement of said valve means from said opened position to said closed position.

7. A traveling sprinkler as defined in claim 5 wherein said water shutting off means comprises valve means between said hose and said water pressure actuated driving mechanism movable between opened and closed positions, bumper means mounted forwardly of said frame for movement from an inoperative position into an operative position in response to the engagement of an abutment in said path and means for effecting movement of said valve means into said closed position in response to the movement of said bumper means into said operative position.

8. A traveling sprinkler as defined in claim 7 wherein said reel includes a hub structure and a pair of annular side structures extending radially outwardly of said hub structure, said side structures being spaced apart axially a distance of the order of the width of said collapsed hose, a tubular fitting pivotally mounted in said reel for movement between a sprinkling position and a hose winding position, means for detachably securing one end of said tubular fitting to the other end of said hose, means for fixedly securing said reel in a sprinkling position against movement out of such position in one direction of rotary movement and permitting movement out of said sprinkling position in the opposite direction, conduit means communicating at one end with said sprinkler means and having an opposite end arranged to be detachably connected with the opposite end of said tubular fitting when the latter is disposed in said sprinkling position, said tubular fitting when disposed in said sprinkling position transmitting the movement of said frame through said reel to said hose, the path of movement of water through said fitting and said conduit means providing a relatively smooth path of flow of water from said hose to said sprinkler means, said power operated means including a power driven shaft carried by said frame for power driven rotation in one direction, means for selectively drivingly connecting said reel with said power driven shaft to rotate said reel in said opposite direction to wind up said hose on said reel, said hub structure providing an arcuate surface extending generally tangentially to the axis of said tubular fitting when the latter is disposed in said winding position for engaging an adjacent portion of said hose in response to an initial rotational movement of said reel in said opposite direction out of said sprinkling position and surface means dsposed in an annular plane surrouding the axis of said reel, said arcuate surface and said tubular fitting for engaging the next adjacent portion of said hose in response to continued rotational movement of said reel in said one direction so as to form an inner loop in the next adjacent portion of said hose upon which the remainder of said hose is subsequently wound into a single roll in response to continued rotational movement of said reel in said opposite direction and means carried by said frame and in spaced relation to said reel for progressively collapsing said hose into a flat condition to expel any water contained in said hose as the latter is wound on said reel.

9. A traveling sprinkler comprising a frame, wheel means carried by said frame supporting the same for movement along the ground, said wheel means including steerable wheel means movable to direct the movement of said frame, furrow follower means carried by said frame for engagement with a preformed furrow in the ground and operatively connected with said steerable wheel means so as to cause said steerable wheel means to direct the movement of the frame along a path conforming to the path of the preformed furrow, sprinkler means carried by said frame, a water pressure actuated driving means operatively connected with said wheel means to drive the same and propel said frame along the path conforming to the path of said preformed furrow so as to cover the adjacent area with water issuing from said sprinkler means, an elongated, flexible, collapsible hose adapted to be connected at one end to a grounded source of water under pressure and means connecting the other end of said hose with said sprinkler means and said driving means for effecting operation of both sprinkler and driving means when said one end of the hose is connected with a source of water under pressure.

10. A traveling sprinkler as defined in claim 9 including hose guiding roller means carried by said frame for engaging said hose during the forward travel of said frame to direct the hose into a position outwardly of said frame in parallel relation to said furrow.

11. A traveling sprinkler as defined in claim 10 including an arm pivotally mounted on said frame for movement between a laterally outwardly extending horizontal position on either side of said frame, said hose guiding roller means being mounted on the outer end of said arm.

12. A traveling sprinkler as defined in claim 9 wherein said wheel means comprises an axle mounted on the rear portion of said frame for rotation about a horizontal transverse axis, a rear wheel mounted on each end of said axle, and means connected between said axle, and at least one of said rear wheels for selectively connecting said rear axle either in driving relation with said one rear wheel so as to transmit rotation of said rear axle into a forward directional rotation of said one rear wheel or out of driving relation to said one rear wheel in either direction of rotation of said rear axle.

13. A traveling sprinkler as defined in claim 12 wherein said rear axle connecting means includes a ratchet assembly between said one rear wheel and said rear axle including a ratchet wheel and pawls movable between an inoperative position out of engagement with said ratchet wheel and an operative position into engagement with said ratchet wheel.

14. A traveling sprinkler as defined in claim 12 wherein said water pressure actuated driving mechanism comprises a ratchet wheel fixed to said rear axle, pivoted pawl means mounted for oscillatory movement adjacent the periphery of said ratchet wheel and engageable therewith during movement in one direction to drive said ratchet wheel in a forward direction, an elongated lever pivotally mounted on said frame for oscillatory pivotal movement and operatively connected with said pawl means for effecting the oscillatory movement of the latter in response to the oscillatory movement of said lever, a valve block pivotally carried by said frame, a hollow piston rod fixed to said block and fixedly extruding upwardly therefrom, a piston on the upper end of said piston rod, a cylinder connected to said lever, a flow reversing valve carried by said valve block in communicating relation therewith, and last motion means for reversing said flow reversing valve in response to the movement of said cylinder into opposed limiting positions.

15. A traveling irrigation sprinkler comprising a frame, wheel means carried by said frame supporting the same for movement along the ground, said wheel means including steerable wheel means movable to direct the movement of said frame, furrow follower means carried by said frame for engagement with a preformed furrow in the ground and operatively connected with said steerable wheel means so as to cause said steerable wheel means to direct the movement of the frame along a path conforming to the path of the preformed furrow, sprinkler means carried by said frame, a water pressure actuated driving means on said frame for effecting movement of said frame along a predetermined path to be covered by water issuing from said sprinkler means, a length of flexible, collapsible hose having one end adapted to be connected with a source of water under pressure, means connecting the other end of said hose with said sprinkler means and said driving means when said one end of the hose is connected with a source of water under pressure, a reel rotatably carried by said frame, and power means on said frame for effecting a rotational movement of said reel to wind up said hose thereon when the one end of said hose is disconnected from a source of water under pressure.

16. A traveling sprinkler as defined in claim 15, wherein said follower means is mounted on said frame for movement between an operative position in engagement with said preformed furrow and a raised inoperative position disposed out of ground engagement, and a furrow opener mounted for movement between an operative ground engaging furrow forming position and a raised inoperative position out of ground engagement.

17. A traveling sprinkler as defined in claim 15, wherein said steerable wheel means includes a yoke pivotally mounted on the forward portion of said frame about an upright axis, a horizontally extending axle carried by said yoke, a steerable wheel on said axle, and wherein said furrow follower means comprises a rigid frame structure extending forwardly of said steerable wheel and connected at its rear end with said yoke for pivotal movement therewith about said upright axis and for swing movement in a vertical plane, a furrow follower mounted on said rigid frame structure, and a tractor hitch carried by the forward end of said rigid frame structure.

18. A traveling sprinkler as defined in claim 17 wherein said furrow follower comprises a furrow engaging wheel mounted on the forward portion of said rigid frame structure for raising and lowering movement with respect thereto and a furrow opener mounted on said rigid frame structure between said furrow engaging wheel and said steerable wheel for raising and lowering movement with respect to said rigid frame structure.

19. An irrigation sprinkler comprising a frame, wheel means supporting said frame for movement along the ground, sprinkler head means carried by said frame, a length of hose of an extent and diameter size sufficient for use in agricultural field irrigation, said hose being flexible and collapsible when free of water into a substantially flat condition, a rigid annular hose fitting on each end of said length of hose, said length of hose being adapted to be connected at one fitting thereof with a source of water under pressure and to be initially extended outwardly from said source along side a first portion of a predetermined sprinkler path in a field to be irrigated with its opposite end extending around to the rear of said frame when the latter is disposed at the beginning of said path of travel, a reel mounted on said frame for movement about a transverse horizontal axis, said reel including a hub structure and a pair of annular side structures extending radially outwardly of said hub structure, said side structures being spaced apart axially a distance of the order of the width of said collapsed hose, a tubular fitting pivotally mounted in said reel for movement between a sprinkling position and a hose winding position, means for detachably securing one end of said tubular fitting to the other of said hose fittings, means for fixedly securing said reel in a sprinkling position against movement out of such position in one direction of rotary movement and permitting movement out of said sprinkling position in the opposite direction, conduit means communicating at one end with said sprinkler head means and having an opposite end arranged to be detachably connected with the opposite end of said tubular fitting when the latter is disposed in said sprinkling position so that water under pressure in said hose will flow outwardly of said sprinkler head means and movement of said frame along said path of travel will move said hose therewith through said initial portion of said path and through a second portion of said path wherein said hose extends outwardly from the source in an opposite direction, said tubular fitting when disposed in said sprinkling position transmitting the movement of said frame through said reel to said hose through the adjacent fitting thereof, the path of movement of water through said tubular fitting and said conduit means providing a relatively smooth path of flow of water from said hose to said sprinkler head means, a power driven shaft carried by said frame for power driven rotation in one direction, means for selectively drivingly connecting said reel with said power driven shaft to rotate said reel in said opposite direction to wind up said hose on said reel, said hub structure providing an arcuate surface extending generally tangentially to the axis of said tubular fitting when the latter is disposed in said winding position for engaging a portion of said hose adjacent said opposite hose fitting in response to an initial rotational movement of said reel in said opposite direction out of said sprinkling position and surface means disposed in an annular plane surrounding the axis of said reel, said arcuate surface and said tubular fitting for engaging the next adjacent portion of said hose in response to continued rotational movement of said reel in said one direction so as to form an inner loop in the next adjacent portion of said hose upon which the remainder of said hose is subsequently wound into a single roll in response to continued rotational movement of said reel in said opposite direction and means carried by said frame and in spaced relation to said reel for progressively collapsing said hose into a flat condition to expel any water contained in said hose as the latter is wound on said reel.

20. An irrigation sprinkler as defined in claim 19 wherein said tubular fitting includes means for releasing the securement of the other end of said hose while the latter is wound on said reel in said single roll so that when said hose is paid out from said reel said other hose end will releasably disengage said tubular fitting.

21. An irrigation sprinkler as defined in claim 19 wherein said reel rotation selective means comprises a reel shaft journaled on said frame and drivingly connected with said power driven shaft, said reel hub structure being rotatably mounted on said reel shaft, an adjustable friction brake connected between said reel and said reel shaft so as to permit said braked rotational movement of said reel with respect to said reel shaft and disengageable means engageable between said reel and said reel shaft for positively fixedly securing said reel for rotation with said reel shaft.

22. An irrigation sprinkler as defined in claim 20 wherein the axis of said reel extends horizontally from side to side of said frame, said hose collapsing means being disposed in the central portion of said frame in spaced alignment with the side structures of said reel, and means for receiving and guiding said hose as the latter is paid out from said reel so as to progressively position the paid out hose in either one of two positions outwardly of opposite sides of said frame.

23. An irrigation sprinkler as defined in claim 19 wherein said sprinkler head means comprises an elongated rigid pipe having a sprinkler head mounted on one end thereof, and means for mounting the opposite end portion of said rigid pipe on said frame for movement between a sprinkling position wherein said pipe extends generally vertically and a transport position wherein said pipe extends generally horizontally.

24. A traveling sprinkler as defined in claim 23 including means for moving said pipe between said sprinkling and transport positions.

25. A traveling sprinkler as defined in claim 19 including means for shutting off the flow of water through said sprinkler head means in response to the movement of said frame along said path a predetermined distance.

26. An irrigation sprinkler as defined in claim 19 wherein said hose collapsing means comprises opposed rollers and means for moving said rollers toward and away from each other.

References Cited

UNITED STATES PATENTS

| | | | |
|---|---|---|---|
| 1,111,243 | 9/1914 | Whitworth | 172—26 |
| 2,320,477 | 6/1943 | Souther | 239—196 |
| 2,518,990 | 8/1950 | Keener | 239—191 X |
| 2,931,579 | 4/1960 | Ruddell | 239—179 |
| 2,974,876 | 3/1961 | Poynor et al. | 239—199 X |
| 3,043,520 | 7/1962 | Nelson | 239—191 X |
| 3,104,821 | 9/1963 | Anderson | 239—179 |
| 3,126,156 | 3/1964 | Rinkewich | 239—183 |
| 3,175,769 | 3/1965 | Fischer | 239—183 |
| 3,415,151 | 12/1968 | Karmann | 239—191 |

FOREIGN PATENTS 698,743  11/1964  Canada.

ROBERT E. PULFREY, Primary Examiner

S. C. PELLEGRINO, Assistant Examiner

U.S. Cl. X.R.

172—26; 239—183, 191, 195